US012549558B1

(12) United States Patent
Gee et al.

(10) Patent No.: US 12,549,558 B1
(45) Date of Patent: Feb. 10, 2026

(54) IDENTITY GOVERNANCE AND ADMINISTRATION WITH SECURE DELEGATION OF AUTHORITY FOR IDENTITY AND ACCESS MANAGEMENT FOR COMPUTER NETWORKS

(71) Applicant: ICSynergy Software, LLC, Plano, TX (US)

(72) Inventors: Martin Gee, Dallas, TX (US); Anthony Salerno, Dallas, TX (US)

(73) Assignee: Evolved Identity Solutions LLC, Prosper, TX (US)

( * ) Notice: Subject to any disclaimer, the term of this patent is extended or adjusted under 35 U.S.C. 154(b) by 689 days.

(21) Appl. No.: 17/643,757

(22) Filed: Dec. 10, 2021

(51) Int. Cl.
*H04L 9/40* (2022.01)

(52) U.S. Cl.
CPC .......... *H04L 63/105* (2013.01); *H04L 63/102* (2013.01)

(58) Field of Classification Search
CPC ........................... H04L 63/105; H04L 63/102
USPC ............................................................ 726/4
See application file for complete search history.

(56) References Cited

U.S. PATENT DOCUMENTS

| | | | | |
|---|---|---|---|---|
| 6,035,038 A * | 3/2000 | Campinos | ............. | H04N 7/163 340/5.74 |
| 8,341,242 B2 * | 12/2012 | Dillon | ............... | H04N 21/4508 725/120 |
| 8,526,929 B1 * | 9/2013 | Gilbert | ................... | H04M 3/38 455/418 |
| 10,523,682 B1 * | 12/2019 | Badawy | ............. | H04L 63/1408 |
| 11,411,881 B2 * | 8/2022 | Cahill | ..................... | G06F 21/31 |
| 2002/0116642 A1 * | 8/2002 | Joshi | ................... | H04L 61/4523 707/E17.112 |
| 2004/0186809 A1 * | 9/2004 | Schlesinger | ............ | G06F 21/62 705/50 |
| 2022/0200995 A1 * | 6/2022 | Morin | .................. | H04L 63/101 |

OTHER PUBLICATIONS

Happiest Minds Technologies Pvt. Ltd, Identity Relationship Management, Nov. 2013, 7 pages.
Kantara Initiative, Refining the Design Principles of Identity Relationship Management, v. 2.0f, May 26, 2017, 17 pages.
Kantara Initiative, The Laws of Relationship Management, v. 1.0, Feb. 25, 2015, 18 pages.

* cited by examiner

*Primary Examiner* — Michael S McNally
(74) *Attorney, Agent, or Firm* — Marc A. Hubbard; Hubbard Law, PLLC

(57) ABSTRACT

In an identity governance system, processes enable secure delegation of authority to create and manage identities for users of a computer network and to provision access entitlements to users to network resources in a manner that ensures compliance with security and access policies. The provisioning of access entitlements to users is controlled based on a model of relationships between business entities that the computer network serves. Identities of users are assigned to a node of the model. Provisioning of entitlements for coarse and fine-grain access is restricted based on this assignment. The node of the business relationship model limits the scope of what user access entitlements can be assigned, to whom they may be assigned, and who may assign them.

19 Claims, 10 Drawing Sheets

Entitlements for Franchisor Node
Manager
Access Approver
Access_App A
Access_App B
App A User
App B User

Entitlements for Franchisee Node
Manager
Access Reviewer
Access_App B
App B User
Access_Franchisee App
Franchisee App User

IDENTITY GOVERNANCE AND ADMINISTRATION WITH SECURE DELEGATION OF AUTHORITY FOR IDENTITY AND ACCESS MANAGEMENT FOR COMPUTER NETWORKS

FIELD OF INVENTION

The invention generally relates to methods that make computer networks more secure and particularly to computer implemented methods that are enforcing access policies while allowing for delegation of administrative authority securely to provision identities and entitlements in identity and access management systems that manage and control access to resources of computer networks.

BACKGROUND

In general terms, a network is a set of computing devices that share resources located on or provided by interconnected network nodes. Each node will have a public or private address that enables communication between the computing devices and the network nodes according to one or more communication protocols. There are many network types, configurations, and topologies, ranging from a simple local area to complex, widely distributed networks interconnected by different types of private and public transmission media.

Secure operation of a computer network requires controlling access by users to resources available on the network. Not every user should be allowed access to every resource available on the network or the same degree of access. Although access on simple networks can be secured by restricting physical access to the network nodes and physical media interconnecting the network nodes, most business networks rely on controlling access to the resources on the network through software-implemented processes or mechanisms that authorize a user's access to each network resource.

Before a user can be authorized to access a network resource, the user's access to the resource must typically be provisioned. This may involve simply setting up an account on the resource (an application, for example) for the user and establishing login credentials (for example, a password or other identity verification mechanism.) This allows the user to access the resource from the user's computer when the user logs into the network resource.

Provisioning may also involve, optionally, assigning permissions to the user that give the user different types of access. The permissions, the nature of which depends on the network resource, define what a user can do once the resource is accessed, such as what data they can view or edit and what functionality is available to them. Often, this is done using preconfigured groups or roles on the network resource. When the user is given access to the resource, the user is also assigned permissions (by making the user a member of a group, giving the user a role, or in any other manner). It may also involve giving the user administrator (or "admin") privileges.

Access authorization has a "coarse-grain" component—whether the user is authorized to access the network resource—and a fine-grained component, which are the permissions that define what type of access the user is authorized to have on the resource. Authorization to access a network resource, whether it is coarse-grained access or includes fine-grained permissions, is referred to as an "entitlement."

When the user is provisioned on a network resource, the network resource may store credentials for authenticating the user and the user's entitlements. A user logs into the network resource by presenting its credentials. The network resource checks its records to verify the identity of the user and, once authenticated, gives the user the access that the user has been authorized to have.

The size and complexity of the tasks associated with provisioning and controlling access to resources on a network grow with the number and complexity of network resources and users. Furthermore, to achieve and maintain network security, access provisioning and control must comply with policies established for the network. Therefore, managing identities and access to network resources are usually handled on networks by "identity management systems" or "identity and access management systems."

Identity and access management systems will have an identity repository that stores user identities. The identity and access management system will also include software for implementing computer processes that control user access to network resources. This may include automated processes for authenticating a user (authentication) and authorizing the network resource to grant access to the user (authorization), software implementing automated processes for adding, modifying, and deleting data relating to user identities and access (life-cycle management), and software implementing processes to enable auditing of identities and access for compliance with network security policies (governance.)

Each user has a unique identity, or possibly more than one, on the network. Attributes of the user—for example, name, email address, and other information that collectively constitutes a "user profile"—and credentials for authenticating the user are stored in one or more electronic files that implement the identity repository. Entitlements granted to the user are stored in one or more electronic files that implement an "entitlements repository." The data for these repositories are normally but do not have to be stored electronically in a structured fashion, such as a list, table, directory, or database.

The identity repository and entitlements repository may be used to provision user accounts and permissions directly on the network resources. They may also, and more often, be used to authenticate users and provide authorization to grant access during a login process.

Identity repositories can be implemented using a directory service. Directory services are, more generally, used to store and make available information about users, systems, services, and applications available on a network. They can but do not have to be organized in a hierarchical structure. An example of a type of directory service that is used as an identity repository is one that implements the Lightweight Directory Access Protocol (LDAP). Servers that implement LDAP can be contacted by network resources to authenticate a user based on the credentials presented and authorize access to the resource. Another example is Microsoft Corporation's Active Directory (AD), which is a directory service that operates on Microsoft Windows networks. Active Directory includes a directory of users and permissions. It also includes user authentication and authorization mechanisms. However, unlike LDAP, it includes functionality for managing life cycles of identities and assigning and enforcing security policies for all computers within a Windows domain.

Identity and access management can also be implemented as a web or "cloud" based SAAS at servers that are reachable over the Internet at public IP addresses. These services are sometimes referred to as identity as a service (IDaaS). The entity that provides the IDaaS is referred to as an "identity provider" or IDP or IdP. IDaaS services are typically used to authorize access to other cloud-based services. However, an IdP may also be capable of communicating with "on-premises" network resources (applications, on-premises servers, local file stores) to provision users, authenticate users, and authorize access. An IdP may thus be used in place of or in conjunction with LDAP, Active Directory, or other on-premises identity repositories or identity and access management system to manage identities, authenticate users, and authorize access.

IdPs typically implement "single sign-on" (SSO) processes that allow a user to authenticate using a single set of credentials for authorization to access a network resource. Rather than create separate credentials for every web application or credentials separate from the ones used for "on-premises" access to network resources, a user may authenticate and access on-premises network resources and cloud resources using credentials stored in an on-premises identity repository, such as an LDAP directory or an Active Directory instance. "On-premises" generally refers to the server (s) hosting the network resource as being part of an organization's infrastructure. This may include physical servers located at one of the organization's physical sites, on a server co-located at a shared data center, or a virtual server hosted by an IAAS provider.

SSO services implemented by cloud-based identity providers typically rely on the Simple Assertion Markup Language (SAML), OpenID, and OAuth protocols. An identity provider using the SAML protocol may pass to a cloud-based network resource-called a "service provider"-XML-based certificates that are unique to each network resource. User credentials are not passed. A user may initiate logging into a service provider by going to the service provider's site, which will then redirect them to the identity provider's site (service provider initiated SSO) or by going to the identity provider's site first and then manually redirecting to the service provider's site (Identity Provider Initiated SSO.) Either way, they provide their credentials to the identity provider. The user provides its credentials to the identity provider and checks the credentials-a login name and password or some other form of authentication, including biometric-against an identity repository that it maintains. Once authenticated, the identity provider generates a secure, XML-based certificate, referred to as an assertion. An assertion is essentially a claim that the identity provider knows the user and that the user is authorized to access the service provider. The certificate is stored in the user's browser and passed onto the service provider once the user's browser is redirected back to the service provider's site. The assertion will include at least coarse-grained authorization for the user to access the service provider. However, it may also include information about fine-grain permissions that a user is authorized to have, including attributes, group membership, and other information.

Identity governance and administration (IGA) systems enable the implementation of a policy-based approach to managing user identities and controlling access. These systems may or may not include the functionality of identity management systems. Or, put another way, identity and access management systems may incorporate IGA functionality. For example, they can be used to create automated workflows or processes to handle creating or removing user identities, assigning access to network resources and permissions based on user roles, approvals for access, and provisioning coarse-grained access and fine-grained permissions based on a user's role. For compliance, an IGA allows review, reporting, and verification of entitlements and user access to network resources.

Nevertheless, despite these tools, complex computer networks continue to present significant operational and technical challenges to managing identities and access, enforcing access policies, and monitoring compliance that create significant burdens on information technology staff, who must coordinate provisioning and compliance with network security policies. There are further challenges when organization structures change. Managing identities and access and monitoring compliance in complex enterprise networks has become a complex, burdensome, and error-prone task, which can lead to less secure networks. For example, a business may have departments, affiliated entities (e.g., subsidiaries or other related entities), or other types of business units that may operate with some degree of independence or autonomy. The business units may, for example, manage their own users and/or network resources. It could also be a special project of the business, with its own separately managed resources. A business will also have third party suppliers, service providers, distributors, dealers, franchisees, sales representatives or other types of agents, independent contractors, joint venture partners, alliance partners, clients, and customers—or in general an unaffiliated entity with which it has a business relationship, which may also be referred to as a "business partner." Users of a business unit may need access to network resources managed by another business unit. The business may want to give external users of business partners access to network resources managed by the business or one of its business units.

Computer implemented IGA systems rely on creating user groups in LDAPs and Active Directories using one or two basic types of approaches: attribute-based access control (ABAC) and role-based access control (RBAC).

ABAC systems allow, for example, an administrator to set access permissions by attributes. For example, the user—the user's job title, function, and seniority level could determine the work that can be done; the resource—the type of file, the person who made it, or the document's sensitivity; and the circumstances—where the user is, the time of day, the date, etc. Rules can be developed for authorizing user access based on these attributes. This allows for well-defined access control. However, it requires substantial effort and expertise to define complex sets of rules and to maintain them with changes in users, infrastructure, and organization. Furthermore, if the rules are not properly set up to begin with, fixing them requires substantial effort. Additionally, users with multiple job functions will often require unique ABAC permutations that cannot be easily or reliably managed using existing systems and tools.

In an RBAC approach, administrators define roles, grant permissions, and otherwise maintain the security systems. User are assigned to the roles based on the tasks they perform. Permissions follow roles. A new job function becomes a new role applied to dozens (or hundreds or thousands) of employees with only a small amount of work for the administrator. Promotions involve changing roles, not editing permissions as line items. Rules within a RBAC system are simple and easy to execute However, to add granularity, more roles are needed, which in complex system can lead to an explosion of roles to manage.

Thus, in practice the number of groups of users is large and many exceptions are often required. Accommodating changes to the computer network infrastructure and the business organization requires substantial work by IT staff.

These approaches do not handle rapid changes or scale well. Furthermore, the use of multiple identity providers (IdP), different tenancies on IdPs, multiple legacy on-premises identity repositories, and customer software complicate governance over provisioning of identities and user access entitlements. It is also often not possible to use IdPs to manage and provision fine-grain entitlements. Manual, error-pone processes for managing entitlements and access control add to the burden on IT personnel. Additionally, multiple identities for an individual and sharing of login credentials often result due to limitations in the systems that are being used and the burdens on IT and help-desk personnel. Each of these shortcomings singly and collectively create or have associated with them increased security risks.

SUMMARY

The detailed description given below discloses improvements to software implemented processes for identity governance administration in computer networks.

Briefly, certain aspects of the disclosed methods and apparatus enable secure delegation of authority to create and manage identities for users of a computer network and to provision access entitlements to users to network resources in a manner that ensures compliance with security and access policies. The processes allow for decentralization of the IT function and delegation to non-IT personnel the management of identities and access in a computer network in a manner consistent with security and access policies.

In a representative embodiment of these aspects, the provisioning of access entitlements to users is controlled using an identity governance system based on a model of relationships between business entities that the computer network serves. Identities are assigned to a node of the model that represents the business relationship. Provisioning of entitlements for coarse and fine-grain access is restricted based on this assignment. The node of the business relationship model limits the scope of what user access entitlements can be assigned, to whom they may be assigned, and who may assign them. Although user groups, whether defined by attributes or roles, can still be used to define fine-grain entitlements that can be provisioned to authorize user access, the business relationship model allows for the rules and policies to be, in effect, based within a node of the model that represents a relationship. Administrative rights to manage identities and provision access can be delegated to managers associated with the business relationship in a manner that automatically restricts the scope of delegated authority according to the access policies. In another embodiment, nodes in a relationship model can be created or changed quickly using predefined node types that specify the entitlements that can be assigned to users of the node and who may assign them. Furthermore, these node types may, optionally, be based on templates that reflect common relationships found in particular industries.

Other aspects of the disclosure concern methods and apparatus that enable improved, centralized governance over access to network resources in complex computer networks that rely on multiple identity providers or a combination of one or more identity providers and legacy entitlement repositories, improved methods and apparatus for managing fine-grain entitlements across multiple identity providers, and improved methods and apparatus that permit a user to have different entitlements for different areas of responsibility without needing multiple identities or sharing credentials.

These and other aspects of the disclosure are described below in the context of representative non-limiting examples and embodiments, including those depicted in the appended figures. The foregoing summary is intended only to summarize generally some of what is disclosed and is not intended to imply any limitations on the scope or nature of the various aspects.

DETAILED DESCRIPTION

Figure 1:
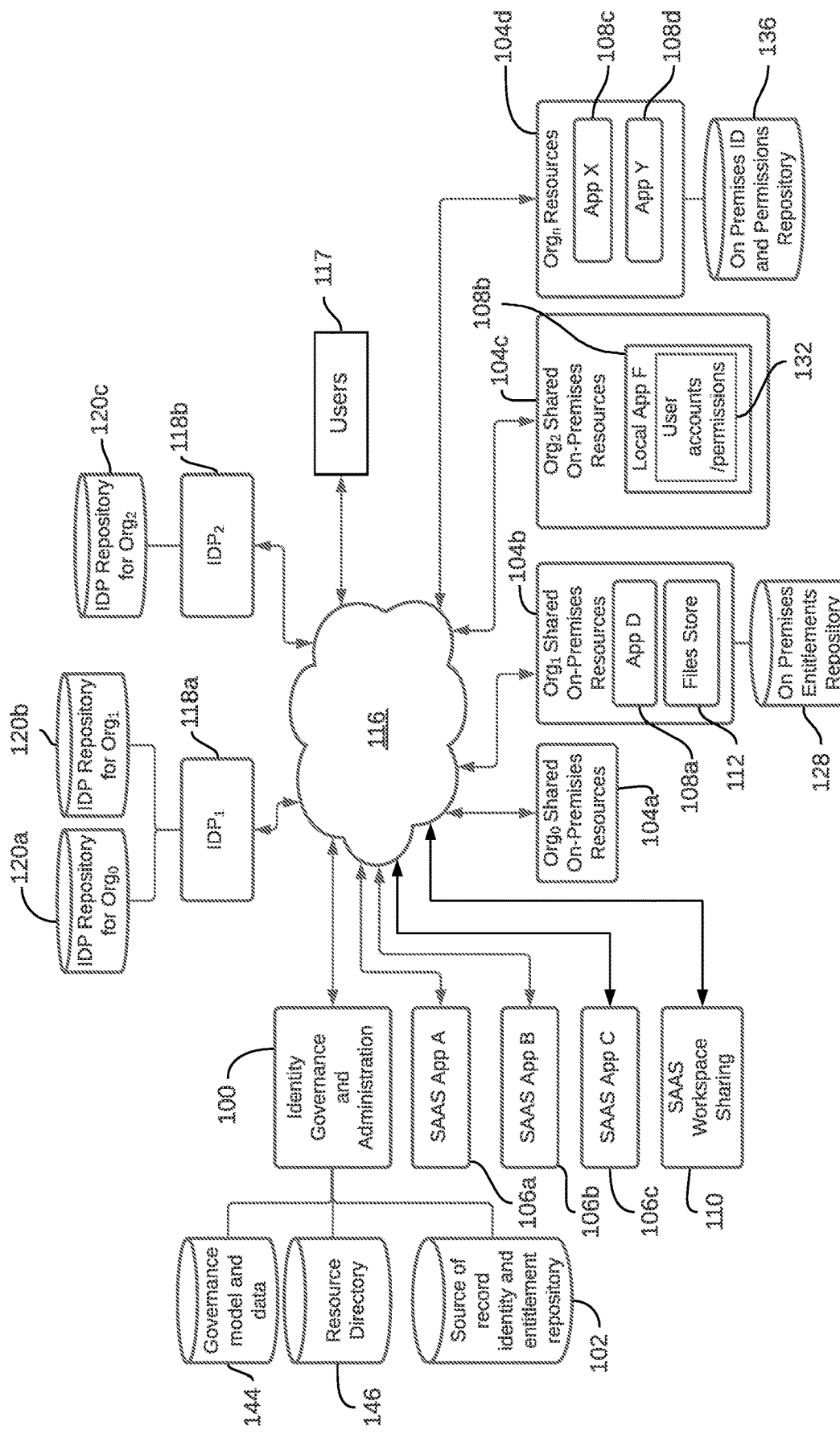
FIG. 1 illustrates schematically a representative, non-limiting deployment of an instance of an IGA system is used to govern the provisioning of access to shared network resources to users of a shared computer network.

In the following description, like reference numbers refer to like components.

For purposes of the following description, a computer network is, in general terms, a group of computers sharing resources located on or provided by network nodes. The computers communicate with each other over interconnections. The interconnections may be implemented using one or more types of transmissions media and may be arranged in a variety of network topologies. Representative and non-limiting examples of computer networks range from a simple local area network to networks having a wide range of complex topologies, such as those involving interconnected local and wide area networks, virtual private networks, and connections to third party networks and the public Internet. A computer network may have network nodes that are "on-premises," meaning on a device at a location controlled by an organization, co-located, meaning a device located in a facility managed by a third party, or on a platform as a service (PAAS) provider. A computer network may also include nodes operated by third parties that provide services to the computer network, such as software as a service (SAAS) and PAAS, and infrastructure as a service (IAAS) provider. The interconnection media may be owned and operated by third parties. In the following example, it is assumed that the computer network has access to the public Internet through Internet service providers.

A "user" generally refers to a person using a computer on a network but could also refer to a device that is accessing the computer network. Representative, non-limiting examples of possible users of a computer network include employees, contractors, vendors, customers, clients, and guests of a business operating the network, any of its business units (departments, divisions, projects, affiliated entities), and unaffiliated business partners. Users may also include devices owned or managed by the organization and its affiliates, business partners, clients, customers, and service providers.

Representative non-limiting examples of resources available on a network, to which access may be controlled, include servers running applications or other software that provide services to users of the computer network (including to other resources), including local client-server applications, SAAS, PAAS, and IAAS, electronic data stores, electronic file stores, and devices such as computers and networking devices.

Processes described below are, for example, implemented by executing a program of instructions stored in computer readable memory by one or more computers. The term "computer" includes machines comprised of memory for storing program instructions and one or more processors for executing them, and virtual computing environments capable of executing the programs, such as virtual machines, containers, and compute instances (each a "virtual computer"). A few representative and non-limiting examples of machines or devices comprising or containing programmable computers include mainframe computers, minicomputers, microcomputers, personal computers (PC), web appliances, network routers, switches, bridges, hardware firewalls, mass data storage devices, tablet computers, set-top boxes, smartphones, personal digital assistants (PDA), and cellular telephones. Virtual computing environments may be deployed locally or by a "cloud service provider" that hosts virtualization environments or "infrastructure as a service" (IAAS.) Examples of public IAAS cloud providers include Amazon AWS, Microsoft Azure, and Google GCP. Alternatively, IAAS services could be run on a private server that is accessible only through a private network connection not accessible through the public Internet or at a private IP address (a "private cloud.") Examples of private cloud environments include OpenStack and VMware vCenter.

Programs implementing the processes described below can be configured or adapted to run concurrently on multiple computers or on the same computer using multiple different instances, or in a distributed fashion, with different components of the program on different computers. The term "computer" is, unless otherwise indicated, intended to encompass, explicitly stated otherwise, one or more computers, physical and/or virtual, and is not intended to imply a particular structure for the computer or the program unless explicitly identified.

The software instructions comprising a program being executed are stored by a non-transitory machine-readable medium, which includes any type tangible medium other than transitory signals that is capable of storing, encoding, or carrying instructions for execution by one or more computers to cause a computer to perform the processes described below, or that is capable of storing, encoding, or carrying data structures used by or associated with such instructions. Examples of non-transitory machine-readable media include, but are not limited to, nonvolatile memory, including, by way of example, solid-state semiconductor memory devices such as random-access memory (RAM), read-only memory, flash memory, magnetic disks, magneto-optical disks, and CD-ROM and DVD-ROM disks. The media may function as cache memory, working memory, nonvolatile storage memory, or external memory. It may also be removable. In the description below, the computer, whether physical or virtual, is assumed to have an operating system and libraries of software programs commonly available to applications executing on the computer.

Described below are representative and non-limiting examples of computer processes performed by an identity governance and administration (IGA) system that allows administrators of a computer network to manage and control delegation of authority to provision user access to certain shared resources on the computer network. The IGA system is comprised of one or more application programs and/or supporting software programs such as servers, software libraries, scripts, configuration files, and databases.

Figure 2:
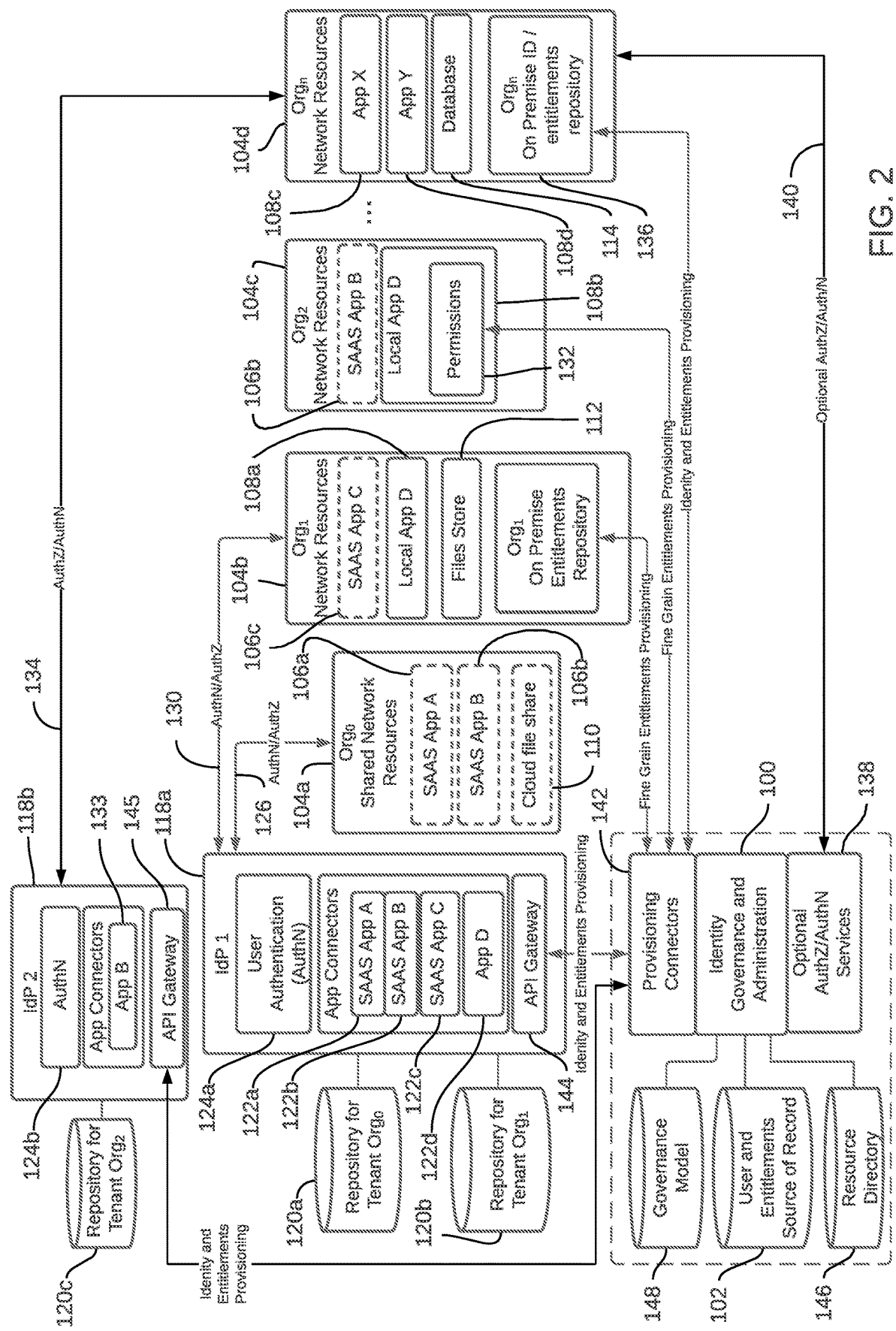
FIG. 2 is an alternative schematic illustration of the representative, non-limiting deployment of an instance of an IGA system of FIG. 1.

FIGS. 1 and 2 illustrate schematically a representative, non-limiting deployment of an instance of an IGA system 100 is used to govern the provisioning of access to shared network resources to users of a shared computer network. FIG. 1 represents a physical view of the network; FIG. 2 is a logical view of part of the network from the perspective of access provisioning and real-time authentication and authorization. The IGA system 100 maintains one or more repositories of identities and entitlements, collectively represented by repository 102, that acts as a source of record for provisioning access to the shared resources of the computer network.

The computer network comprises, in this example, shared resources that are managed or controlled by one of the organizations 104a, 104b, 104c, and 104n. Organizations 104a to 104n represent, for example, business units of the tenant of the IGA system, such as legal entities (for example, a parent corporation and wholly or partly owned subsidiary corporations) or other organizational structures such as divisions, departments, product lines, product development teams, project teams, ad hoc groups of business resources and personnel, or any other type of organizational structure of a business enterprise that manages a network resource to be shared. The network resource may be shared with one or more other business units within the enterprise and with outside, unaffiliated entities or partners such as suppliers, vendors, customers, joint venture partners, and franchisees, and their respective business units. The computer network is simplified for purposes of explaining the processes of the IGA system.

In this example, each of the organizations is assumed to be part of a business enterprise. An enterprise can be thought of as being comprised of one or more legal entities. In the case of multiple legal entities, each legal entity in the enterprise controls, is controlled by, or is under common with one or more of the other legal entities within the enterprise. However, one or more of the organizations 104a-104n may, optionally, not be part of the business enterprise but has some sort of business relationship with it. It could be, for example, a joint venture partner, customer, supplier, distributor, retail store, franchisee or franchisor, or a service provider.

A central information technology (IT) group or "help desk" (not indicated) may have administrative responsibilities for maintaining and managing access to all the resources, or different IT or "help desk" groups may have different levels of administrative responsibilities for different resources or groups of resources.

Shared resources available on the computer in this simplified example include SAAS apps A, B, C, and D, which are identified in the figures by reference numbers 106a-106c. The SAAS apps can be a single tenant or multi-tenant applications running on a server owned and managed by a third party. Organization 104a is a tenant of SAAS app A 106a and SAAS app B 106b; organization 104b is a tenant of SAAS app C 106c; organization 104c is another tenant of SAAS app B 106b. Software applications or "apps" D, E, X, and Y, identified by references numbers 108a-108d, respectively, are applications hosted by one or more "on-premises" servers of organizations 104b (app D), 104c (app E), and 104d (apps X and Y). Additional, representative examples of network resources in these figures also include a SAAS shared workspace 110 of organization 104a, on-premises file store 112 on an "on-premises" server of organization 104b, and an on-premises database 114. These resources are intended to be merely representative and not an exhaustive list of all possible resources or configurations of resources.

Processes of the IGA system 100 govern the provisioning of user identities, coarse grain access, and fine-grained entitlements to identity and entitlement repositories relied upon by an organization managing a shared resource to provision and authorize a user's access to a shared resource. Representative and non-limiting examples of these repositories include directories like LDAP directories, Active Directory, and other types of on-premises repositories, as well as identity providers (IDPs).

In the example shown in FIGS. 1 and 2, the organization 104a (Org$_O$) uses identity provider (IDP) 118a to manage identities for its shared resources, which are SAAS app A 106a, SAAS app B 106b, and SAAS shared workspace 110. Organization 104a is a tenant of IDP 118a. IDP 118a stores user identities and at least coarse-grain access entitlements for the shared network resources of organization 104a in repository 120a. As shown in FIG. 2, the IDP 118a provisions user access on SAAS apps A and B using app connectors 122a and 122b, respectively. The IDP 118a will also authenticate the users seeking to access SAAS apps A and B using, for example, a single sign-on (SSO) authentication (AuthN) process 124a and authorize SAAS apps A and B using an authorization (AuthZ) process (not indicated) to give access to a user, as represented by AuthN/AuthZ line 126.

Organization 104b (Org$_b$) is an example of an organization that also uses IDP 118a for an identity service but is a separate tenant with a repository 120b that stores identities and coarse-grained access for its tenancy on SAAS app C 106c, its on-premises app D 108a, and, optionally, its on-premises file store 112. App connector C 122c of the IDP 118a provisions access for the identities it manages to on-premises app D 108a. As indicated by line 130, it will also provide real-time authentication and authorization for user access to SAAS app C, on-premises App D, and optionally on-premises file store 112. Organization 104b also maintains one more on-premises repositories that are collectively represented by on-premises repository 128 to store fine grain entitlements for SAAS App C, on-premises app D, and the on-premises file store 112. In this example, on-premises repository 128 is used to store and to provision and/or authorize fine-grain entitlements for users authorized to access SAAS app C, on-premises app D, and on-premises file store 112. It may also be used to provision on the IDP 118a coarse-grained access to the on-premises file store 112 to users provisioned on the IDP 118a. Alternatively, it can be used to authorize the on-premises file store 112 in real-time to give access to users that are authenticated by the IDP 118a.

Organization 104c (Org$_c$) is an example of an organization that uses a different identity provider, IDP 118b. In this example, the shared resources of organization 104c are its tenancy on SAAS App B 106b and an on-premises app E 108b. App E stores user accounts and permissions 132 in configuration files or databases instead of an on-premises repository like an LDAP directory or Active Directory instance. Identities as well as coarse and fine-grained entitlements for SAAS app B are stored by IDP 118b in the repository 120c and provisioned to the SAAS app B. using app connector 133. The IDP 118b provides real-time authentication and authorization with a single sign-on (SSO) authentication (AuthN) process 124b, for access to SAAS app B with an assertion that includes fine-grained entitlements. On-premises application App E 108b may also be configured to use IDP 118b for user authentication and coarse-grained access authorization as indicated by line 134. However, because its permissions are stored by the application, the fine-grained entitlements for App E are not stored or provisioned by IDP 118b.

Organization 104n (Org$_n$) is an example of one which does not use an IDP. It has an on-premises identity and entitlements repository 136 that stores identities, coarse grained access, and fine-grained entitlements for its shared resources: on-premises App X 108c, on-premises App Y 108d, and on-premises database 114. Repository 136 authenticates users and provides real-time authorization to access these shared resources.

Computers of users, which are collectively represented by block 117, access the network resources, which include the SAAS network resources and the on-premises network resources, through interconnected networks that are collectively represented by cloud 116. The interconnected networks allow computers of the users to communicate with SAAS apps 106a-106c, SAAS shared workspace 110, identity providers 118a and 118b, IGA system 100, and on-premises resources such as apps D, E, X, and Y, on-premises file store 112, and on-premises database 114. The cloud is not intended to represent a particular network infrastructure. It could, for example, represent private networking infrastructure that provides to the computers of users access to the on-premises resources and to gateways that provide access to hosts with public IP addresses, such as SAAS providers and the IdPs. (The host of the IGA system 100 could be reachable on the private interconnected network, the public Internet, or both.) The cloud 114 could, alternatively, represent publicly accessible IP network infrastructure that allows users to connect through the public Internet to the computers hosting of the SAAS and IdP providers and to on-premises hosts for the on-premises resources through the public Internet (with the host for the on-premises resources having public IP addresses, for example.) The nature of the networking infrastructure is not limited by the IGA system 100. However, the IGA system needs to be able to communicate with the hosts of the identity and entitlements repositories for the shared resources, and the users 117 need to be able to communicate with the host of the IGA system 100.

The IGA system may, optionally, provide authentication and/or real-time authorization with programmed computer processes 138. If it has this capability the source of record repository may also function as an entitlement repository that provisions access on the resource and, if required, also provide real time authorization of access. The source of record repository thus could be used as an entitlement repository while also, optionally, provisioning assigned entitlements to entitlement repositories that, in turn, provision access on the network resource and/or provide real time authorization of access to an authenticated user. This capability can be used to support shared resources that do not, for example, have a separate entitlement repository or SSO user authentication service. These programmed computer processes may, optionally, be hosted separately and make use of repository 102. FIG. 2 illustrates this option, with "optional AuthZ/AuthN" line 140 extending to organization 104d for use by one or more of the on-premises resources. Furthermore, an entitlement repository, such as an IDP, could be configured to provide one or more of the processes described below to also act as the source of record repository.

Figure 3:
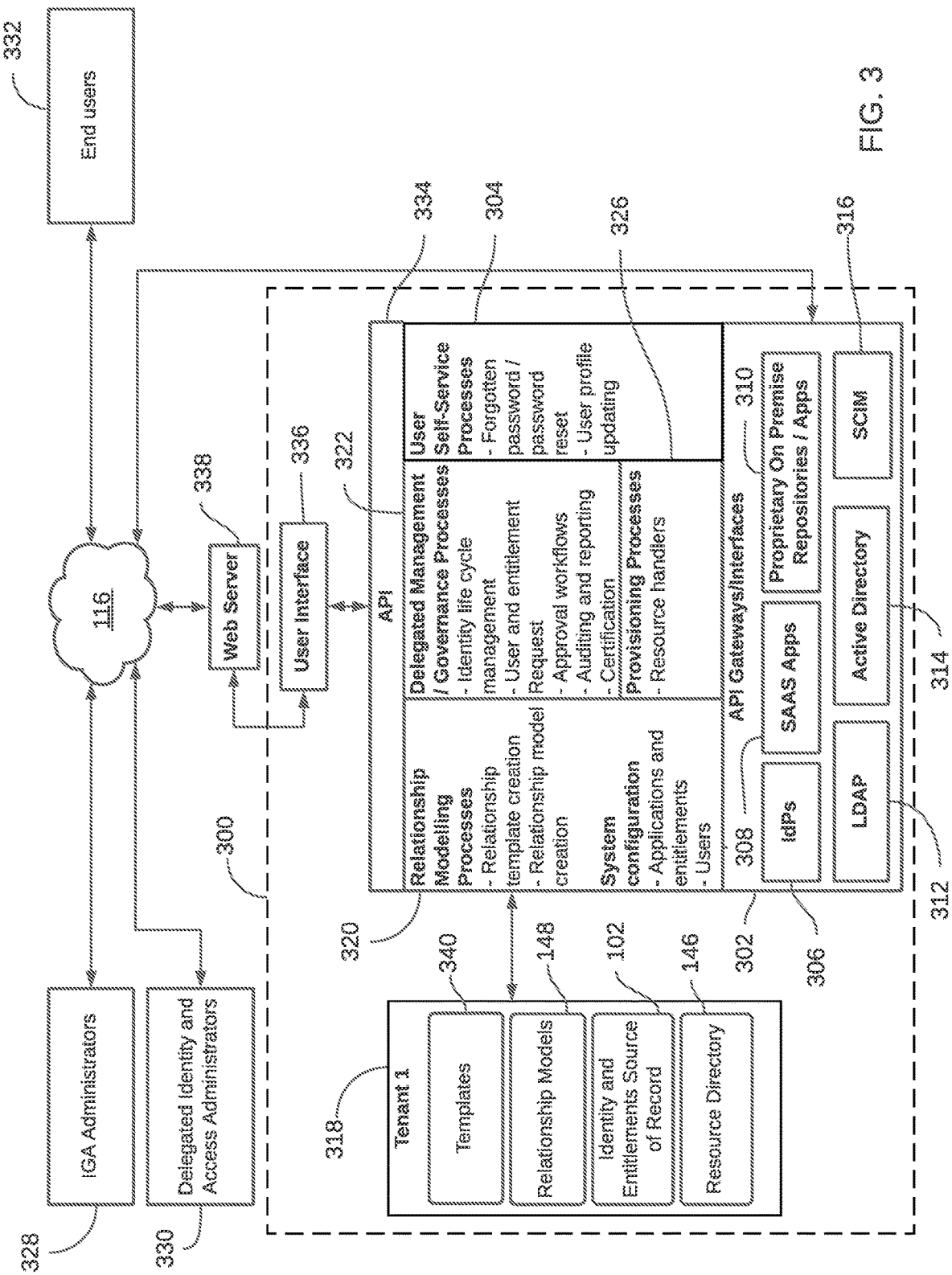
FIG. 3 is a schematic representation of the functional components of a representative embodiment of an IGA system.

Reference is now made also to FIG. 3 in addition to FIGS. 1 and 2. FIG. 3 is a schematic representation of the functional components of a representative embodiment 300 of the IGA system 100.

Figure 9A:
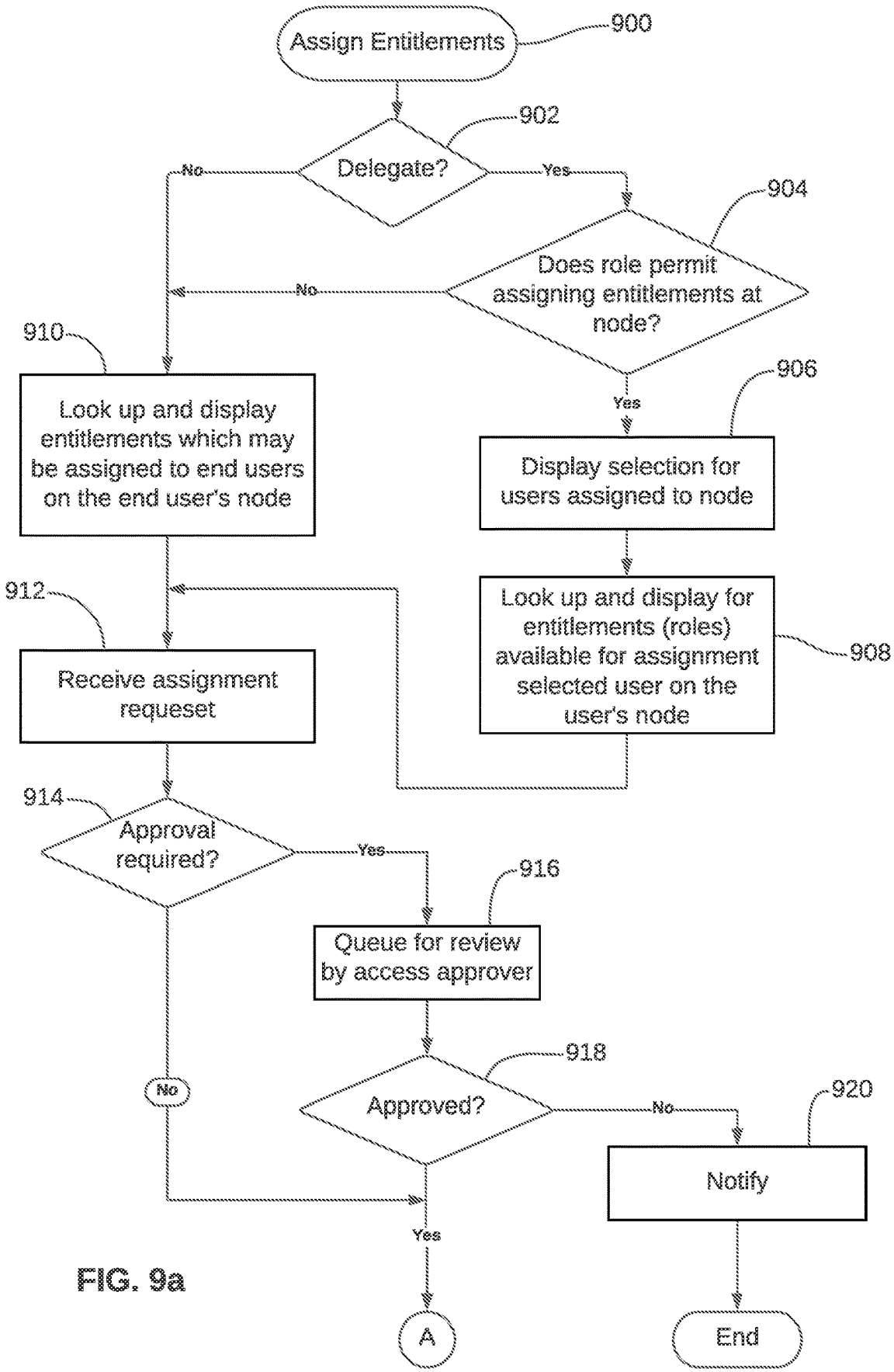
FIGS. 9A and 9B are a flow diagram of the basic steps of a representative and non-limiting example of an implementation of a computer process to assign entitlements in an IGA system.
Figure 9B:
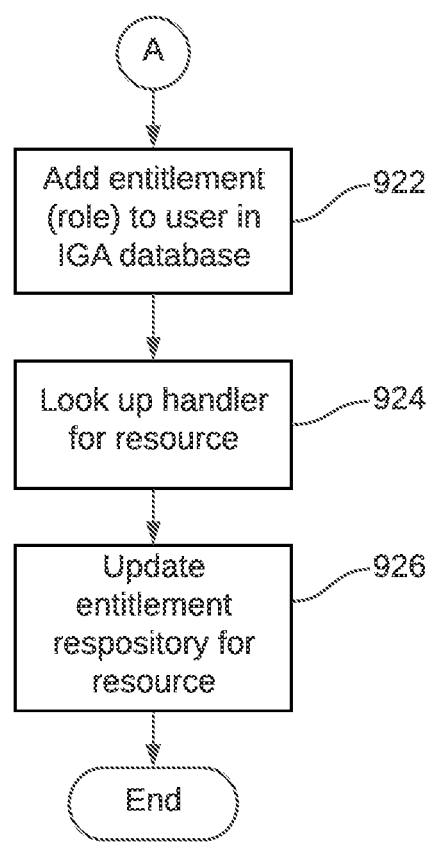

User identities are given coarse-grained access and fine-grained entitlements through an access request process described in more detail below in connection with FIGS. 9a-9b. If the access is approved, the identity and coarse access entitlements are provisioned to an identity repository, and fine-grained entitlements are provisioned to a repository for the shared resource's fine-grained entitlements if it is different. Identities and/or fine-grained entitlements can be, optionally, provisioned directly to the shared resource if there is not a corresponding repository.

The provisioning is carried out by programmed computer processes collectively represented by the provisioning connectors 142 in FIG. 2. In FIG. 3, these programmed processes are collectively referred to as "API Gateways/Interfaces" 302. The IGA system includes one or more gateways and interfaces that enable core IGA processes 304 to communicate with remote servers for purposes of, for example, provisioning and possibly other purposes. These may include application-level interfaces to, for example, one or more of the following: identity providers, collectively represented by block 306; SAAS, IAAS, and PAAS providers, which are collectively represented by block 308; proprietary on-premises identity and entitlement repositories and applications, collectively represented by block 310; LDAP 312; Active Directory 314; and SCIM 316. The interfaces enable the core IGA processes to interact with remote applications using application programming interfaces (APIs), examples of which are API 144 of IDP 118a or API 145 of IPD 118b. It may also include one or more gateways that handle communication protocols and that support standard protocols specifically used for identity and access provisioning, such as LDAP—to communicate with on-premises LDAP repositories—and SCIM (System for Cross-domain Identity Management) providers. SCIM is a standard protocol that, if supported by service providers (SAAS, PAAS, IAAS), enables communication with directories of the services providers to facilitate provisioning.

These are examples of gateways and interfaces that may be used. A particular instance of the IGA system does not need to support all protocols and all APIs. However, supporting identity providers and on-premises repositories offer technical advantages that enable a single point of integration that can be used to integrate on-premises and legacy resources and repositories with identity providers. Furthermore, identity providers may not have or offer the ability to provision fine-grain entitlements for a particular resource. The IGA system may be configured to provision fine-grain entitlements to repositories used by the resource to authorize access to these entitlements or directly to an application (SAAS or on-premises) while accommodating the use of, for example, an identity provider for coarse-grained access and user authentication.

Thus, an IGA system, as a single point for provisioning, can be configured to enable or make it capable of managing the provisioning of access in complex, heterogeneous networks with multiple identity providers or a combination of IdPs and on-premises repositories. FIGS. 1 and 2 are representative, non-limiting examples of this capability.

The core programmed processes 304 of the IGA system 300 include, for example, IGA system administrator processes 320; delegated management and governance processes 322; user self-service processes 324; and provisioning processes 326.

IGA system administrator processes are used by system administrators 328 to configure the system and to set up relationship models, which are described below. For each tenant 318, the IGA system has at least one governance model, an example of which is a hierarchical "relationship model" that is stored in one or more databases and files collectively represented by database 148. Also stored for each tenant are one or more resource directories, which are collectively represented by resource directory database 146 that is stored on the hose for the IGA system. The resource directories store predefined entitlements, including fine-grain entitlements, for access to network resources by users with identities managed by the IGA system.

The delegated management and governance processes 322 enable users called delegated administrators 330 (or "delegates") to authorize provisioning of identities and entitlements to identity and entitlements repositories or directly to applications and other network resources based on a relationship model created by an IGA system administrator. The processes include, for example, workflows that support the management of identities and access, as well as auditing, reporting, and certification of identities and access for governance purposes. The user self-service processes allow end users 332 of the computer network to perform certain functions, each of which is optional: updating certain user profile information or attributes; changing a password or other authenticating credentials, including handling a forgotten password or requesting a password reset. The provisioning processes 326 are automated processes that handle the provisioning to identity and entitlement repositories or directly to applications of identities and entitlements. Some of these processes are described in greater detail below.

In this example, the IGA system includes an application programming interface (API) 334 for a user interface 336 that IGA administrators 328, delegated administrators 330, and end users 332 to interact with the IGA core processes 304. This allows, for example, for the user interface to be implemented using a client/server model as a client application running on a user's computer that communicates directly with the remote API or as a web application using HTML documents and code in the form of scripts that are served by web server 338 to a web browser running on a remote computer and accessible through the network 116. In this example, the user is implemented as a web application implementing the user interface and the web server need not be running on the same address space or on the same computer. Alternatively, the user interface can be implemented as part of an application that implements the IGA core processes 304.

One benefit of a web application implementation for the user interface is that it can be dynamically generated based on any one or more of the following: the type of user (administrator, delegated administrator, end user); the tenant, what node in a relationship model the user is assigned to, that user's entitlements (both for the IGA system and other network resources), and that user's selected "persona," which is described below. Thus, for example, basing the generation of the user interface on the tenant and/or node allows for custom branding and/or other functionality or links to be made included or not included. Similarly, only functionality to which that user may be entitled to access or to use on the IGA system can be displayed. For example, links to pages that allow a user to interact with administrative functions might not be displayed for end users, and only links to applications that a user has access to are displayed.

The data stores could be stored on the same or a different computer than the IGA system core processes 304.

Although an IGA system implemented as a separate application running on a separate host allows it to be used as a source of record for provisioning to multiple identity providers and on-premises repositories, some or all the processes from the IGA could be incorporated into applications that provide identity and access management, including software of identity providers.

Figure 4:
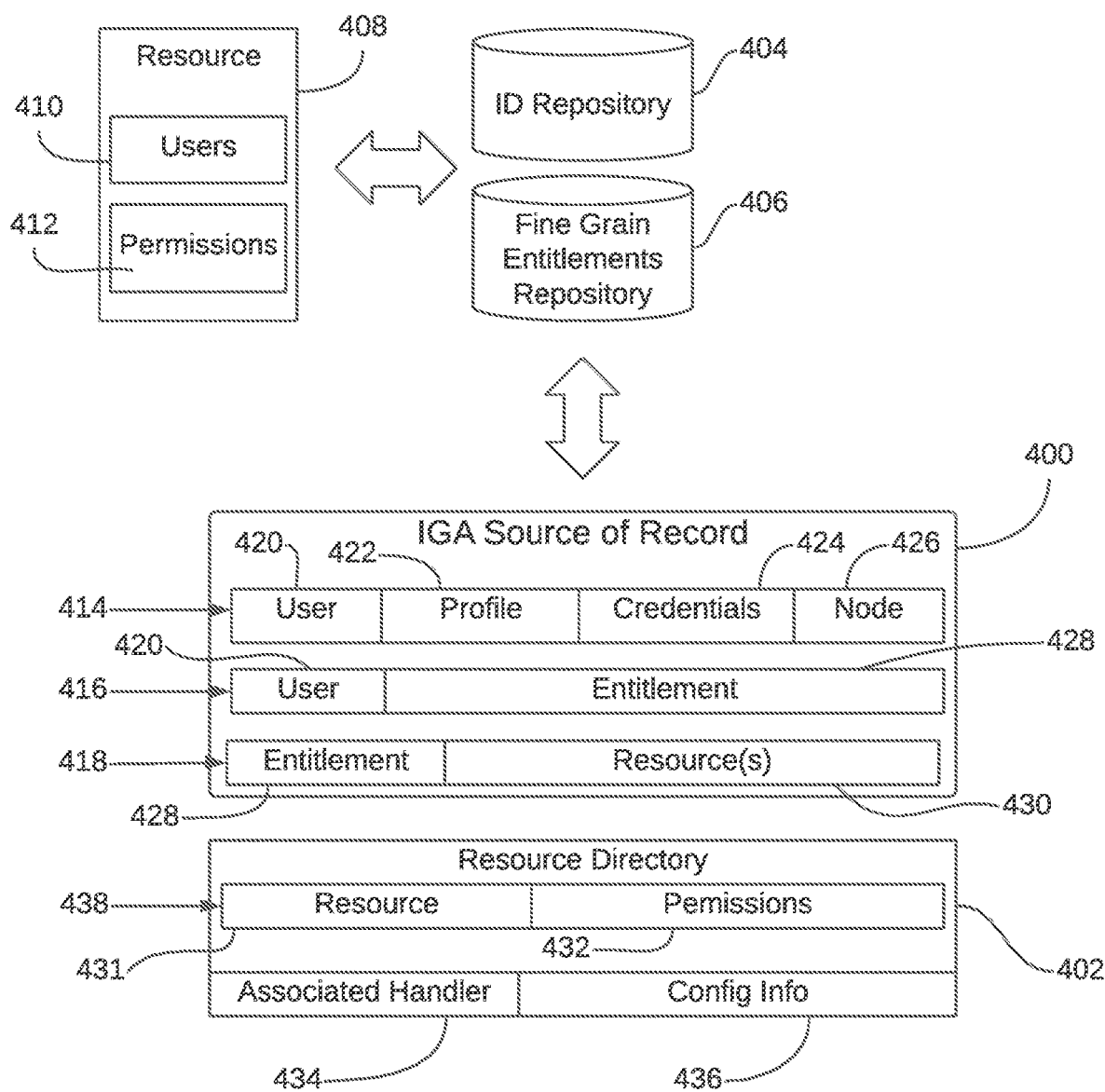
FIG. 4 illustrates schematic relationships between representative data stores used by an IGA system.

FIG. 4 illustrates schematic relationships between representative data stores used by an IGA system, such as IGA system 100, to implement the programmed processes described herein, and represents their relationship to identity and entitlement repositories to which identities and entitlements can be provisioned by the IGA system.

IGA source of record 400 and resource directory 402 illustrate schematically non-limiting examples of the types of information being stored and logical relationships between the information being stored in the, for example, data stores represented by identity and entitlements source of record repository 102 and resource directory database 146 in FIGS. 1-3.

The schematic representations of fields, records, tables, and data stores in this figure are intended to represent logically the type of information stored and the relationships for use in executing the processes described herein by the IGA system and repositories of identities and entitlement, with which it communicates to provision identity and entitlement information. They are not intended to represent database schema, as such, though they could be used as a basic schematic model for a comprehensive data scheme if desired. Thus, a reference to "table," for example, does not imply a single table or even multiple tables in a relational database. A reference to "field" does not imply that the information stored in the field can only be stored in one field or that it must be stored as part of a record in a particular table. For example, it could be stored in another table and referenced.

IGA source of record 400 represents non-limiting examples of the types of information on identities, assignments of entitlements to identities, and the resource(s) for each entitlement that may be provisioned to identity and entitlement repositories using the IGA system 100 and their logical relationship. Resource directory 402 represents non-limiting examples of the types of information stored for use by the IGA system for use in provisioning identities and entitlements to one or more repositories (or optionally, directly to a network resource such as an application, which is not illustrated), which are represented schematically by ID repository 404 and fine-grain entitlements repository 406. ID repository 404 and fine-grain entitlements repository 406 are then used to authorize network resources, which are represented by network resource 408, such as application (on-premises or SAAS). The network resource or application may, for example, store information on authorized users, represented by users 410 (or user accounts) and the privileges that users may be authorized to have or have been authorized to have, collectively represented by privileges 412.

The IGA source of record 400 logically comprises three general types of records: records storing information relating to user identities, represented by identities table 414; records storing information on assignments of entitlements to identities, represented by assigned entitlements table 416; and records storing information on entitlements that may be assigned to identities, represented by assignable entitlements table 418. For each identity, the source of record may include information that functions as a user identifier 420, such as a name, email address, or other values, as well as other information about the user, which collectively is referenced by the "profile" field 422. Other types of information that can be stored and associated with a user include credentials for authenticating the user, represented by credential field 424, and identification of a node (or possibly multiple nodes) of a relationship model used by the tenant in the IGA system to govern the provisioning of access, which is represented by node field 426, A non-limiting example of a credential is a password.

Assigned entitlements table 416 represents records that associate a user, represented by user field 420, with information identifying an "entitlement," represented by entitlement field 428. An "entitlement" is what delegated administrators in the IGA system, which are described below, may assign to users. An entitlement may also be referred to as a "role" in the following description. The term "role" is more easily understood by delegated administrators who are not trained IT personnel. An entitlement for purposes of an IGA system is comprised of a group of one or more predefined "resources." Table 418 associates an entitlement, represented by field 428, with information identifying one or more "resources," represented by resource field 430. There is at least one record for each entitlement. Each resource and what resource or resources are included as an "entitlement" in the IGA system are determined and defined by a system administrator of the IGA system.

The resource directory 402 contains records, represented by resource records table 438, that list each defined "resource" that can be associated with an entitlement defined and stored as an entitlement record. Each resource is identified using some type of identifier or index value represented by resource identifier field 431. A "resource" in the IGA system is defined by or has associated with it a group of one or more predefined "permissions" for a particular application or, more generally, network resource. A permission is defined, at least in part, by an application or network resource, which represents coarse-grained access, and a level of access within the application or network resource, which represents fine-grained access. How the level of access is expressed or defined will depend on the application or network resource. Information specifying the application and level of access is represented by permissions field 432.

The "permissions" correspond to information that is provisioned to the identity and fine grained entitlements repositories 404 and 406 by the IGA system using a "handler." Each resource directory 402 has a handler associated with it.

Because the same gateway or interface may be used to communicate with multiple different repositories, configuration information, represented by configuration field 436, is also stored. The configuration information stored for the interface or gateway that is handling the provisioning for the resources in the resource directory is used by the gateway or interface to set up a connection with the repository associated with the repository and to handle the transport of messages between the processes of IP gateway and remote processes of the repository. Configuration information might include, for example, an IP address for the host, a port to use for the repository service, access credentials, information about protocols, and other information necessary for the gateway or interface to establish a connection with remote repository and to make calls to the API of the remote repository server.

For example, using handlers, the IGA system can be configured to provision identities and access to an IdP, an on-premises repository, or a custom repository (or permissions file) used for an application. An IdP may be capable of passing to an application as part of the authorization for a user to access the application a claim that identifies a predefined group on the application that a user is a member of. Membership in a group corresponds to a level of access; it automatically gives the user a set of permissions for the application. The IGA system will use the associated handler to write to the IdP information that specifies the user's identity and information about the resource that is associated with the entitlement assigned to the user. The resource information identifies the application, for example, which confers coarse-grained access to the application, and, optionally, one or more permissions (such as membership in a group). The permissions define fine-grain access or a level of access to the application. The IdP then provisions the user and, if available, level of access information to the application.

The IGA system can support situations in which, for example, an IdP is used to authorize only coarse-grained access to an application, and another repository, such as an on-premises repository, is used for fine-grained authorization for the application. The "resource" in an IGA resource directory associated with the IdP specifies only access to the application. A resource that includes a level of access is stored by the IGA system in a resource directory associated with the on-premises repository. The IGA system provisioning processes will provision to the IdP coarse-grained access to the application for a user and will provision fine grained permissions for the user to the application to the on-premises repository.

When different tenants on the same IdP are being used to authorize different shared network resources, the IGA system may have a separate IGA resource directory for each tenant as the IdP maintains, in effect, a separate repository for each tenant, an example of which is shown in FIG. 1 with IdP 118a and repository 120a for organization 104a and repository 120b for organization 104b.

With the foregoing structure, the IGA system enables for secure creation and provisioning of new entitlements for a computer network that relies on multiple repositories for authorizing access to shared network resources, including repositories of different types, and for separate repositories to be used for coarse-grained and fine-grained access authorization for the same network resource.

Figure 5:
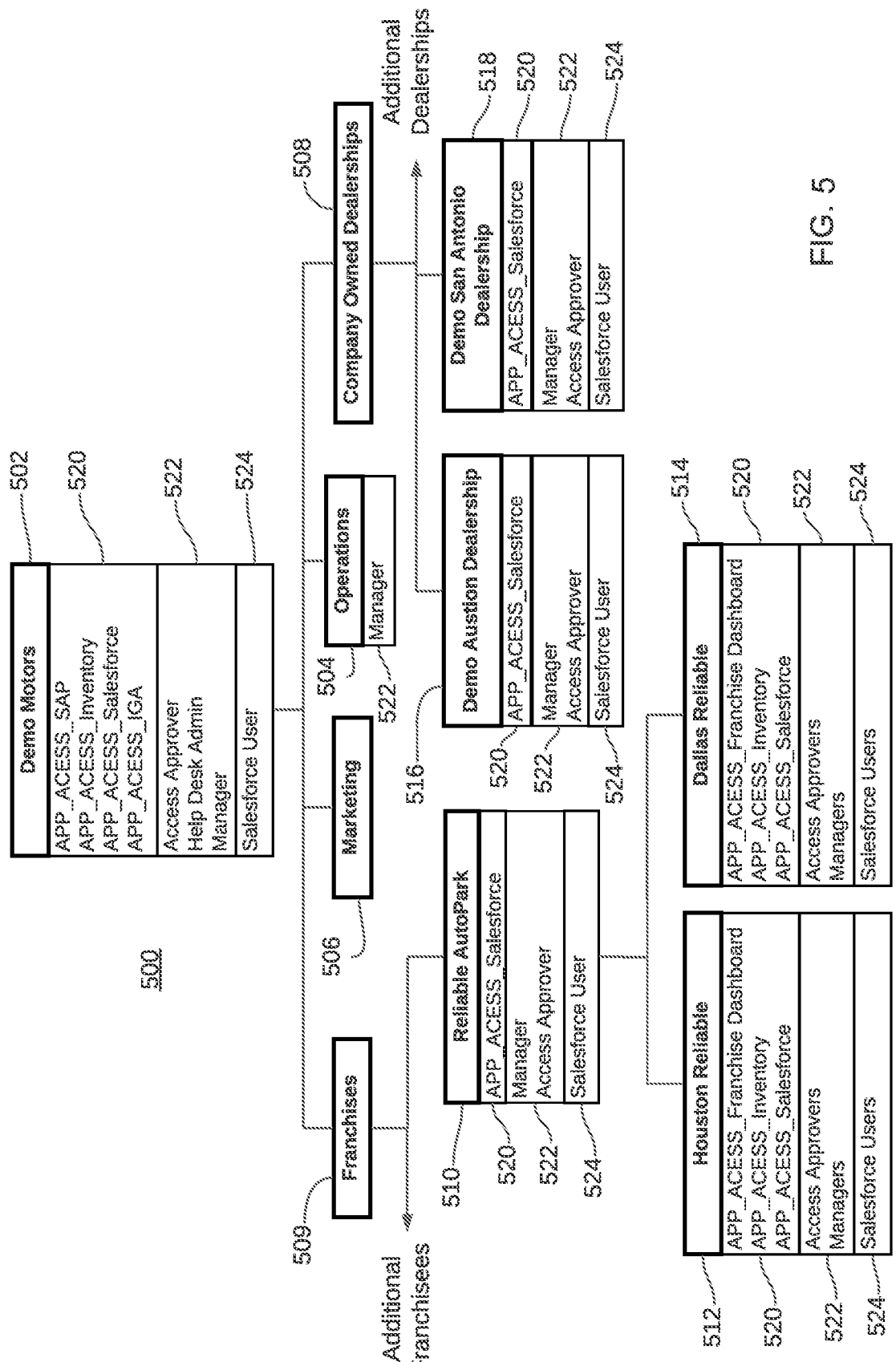
FIG. 5 is a graphical representation of a non-limiting and representative example of a relationship model.
Figure 6:
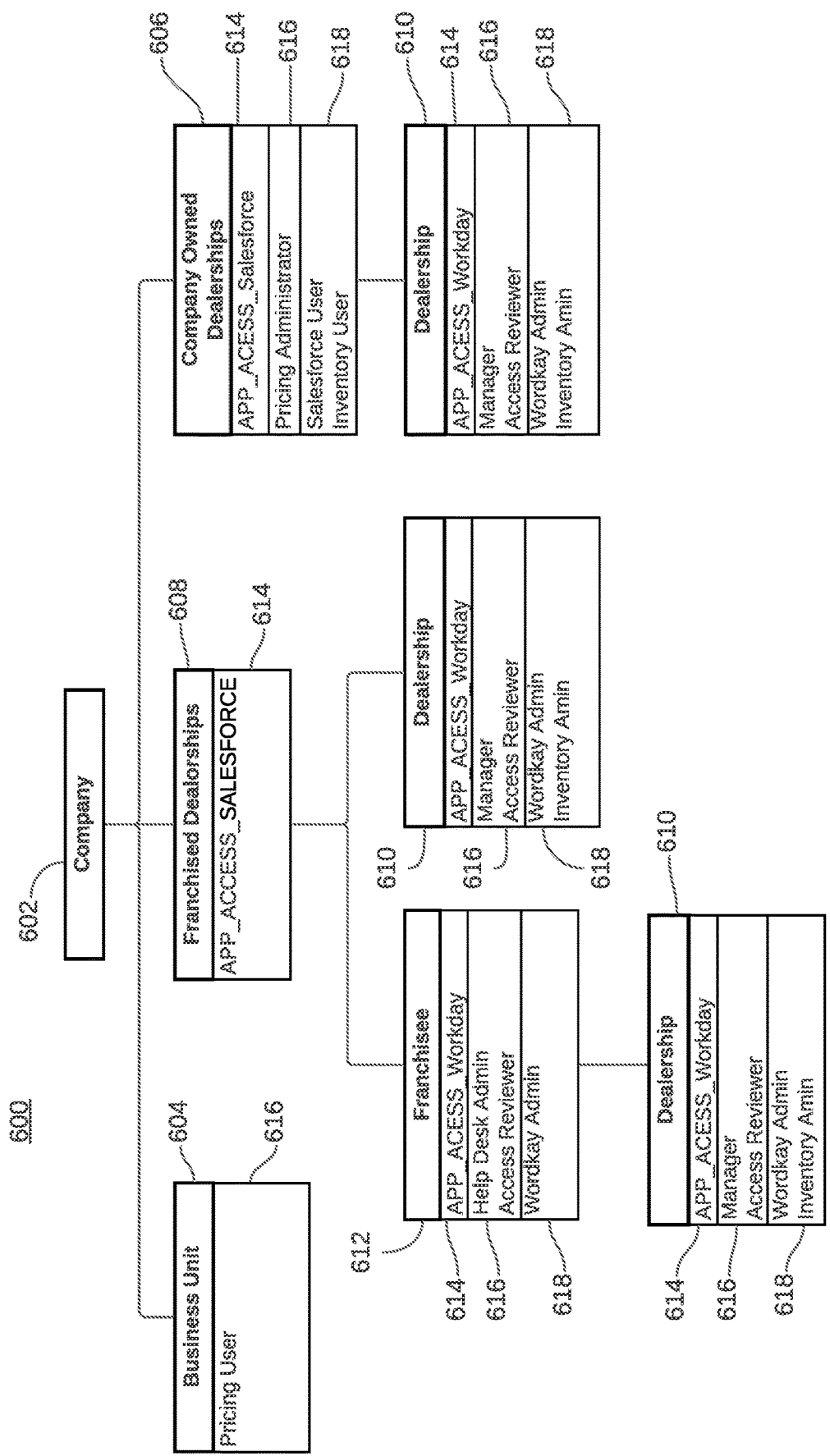
FIG. 6 is an example of a template for a hierarchical business model for a company with company-owned and franchised dealerships that sell the company's products, such as automobiles.

Now referring to FIGS. 3, 5, and 6, one aspect of the representative embodiment of IGA system 100 pertains to the use of a relationship model. The use of a relationship model is optional or not relevant to some of the aspects of the IGA system disclosed herein. However, when used in an embodiment of those aspects it may provide additional advantages or benefits. For each tenant of the representative embodiment of the IGA system that is at least one relationship model that is used to govern the provisioning of entitlements to at least certain network resources to users of a computer network by administrators or, in examples described below, by delegated administrators. The use of a relationship model does not foreclose the option of managing identities and access to the same or different network resources in the same network using different methods or systems. A model in the IGA system can be used for governing the provisioning of access for only a subset of all users of a computer network and for a subset of network resources that are available on the computer network. Furthermore, one or more additional relationship models could be used for governing provisioning of, for example, a different subset of network resources to the same or a different subset of all users for the computer network, or the same subset of network resources to a different subset of users. Information about a relationship model is stored in a data store represented by governance model database 148.

A relationship model is a logical representation of groupings of users of the computer network that is not coupled with or dependent on the topology of the computer network. It comprises a plurality of objects called "nodes." A node does not correspond to a node in a computer network. The model is, preferably, hierarchical in that it at least has a root node and with all other nodes directly or indirectly connected to it.

In an exemplary embodiment, connections between nodes represent or correspond to business relationships between legal, operational, and/or functional entities within a business and between the business and outside business entities, such as suppliers, vendors, service providers, dealers, distributors, and customers. By using a model for governing provisioning of access that corresponds to business entities and their relationships, the user identities can be, if desired, associated with a business unit or organization in which they work. A relationship model for governing the provisioning of user access to shared resources of a computer network that is based on business relationships offers several advantages for implementation of identity and access management The assignment of a user to a node limits the network resources that can be provisioned to the user. Only entitlements that assigned to a node can be assigned to end users assigned to the node and provisioned for the user. Only an entitlement assigned to a node may be assigned to an end user of the node. It may be assigned to the end user upon the end user being assigned to the node, at the request of the user, or by a delegated administrator. A delegated administrator is a user assigned to a node with an assigned administrative entitlement or "role" in the IGA system. A role is an entitlement for in the IGA system 100. A delegated administrator may, for example, be configured to have the permission to request assignment of an entitlement to an end user, to approve a request for an assignment of an entitlement to an end user, or to simply assign an entitlement to end users of the node. For the purposes of the following description, references to an "assignment" of an entitlement refers to any of the foregoing ways of assigning an entitlement to an end user, and references to an assignment by a delegated administrator refers to a request to assign, approval of a request to assign, or simply an assignment unless the context states otherwise.

The scope of the delegated administrative rights is therefore automatically constrained or limited based on the relationship model and may only provision access to certain network resources on the computer for end users assigned to the same node. In one embodiment, a user in a delegated administrator role in the IGA system at one node has within their "scope" users at the assigned node and all child nodes (including nodes that are children of child nodes) in the hierarchy nodes. Unless otherwise stated, a reference to a "child node" is intended to include nodes that are children of child nodes. Such nodes may also be referred to as subsidiary nodes. For example, the IGA system will automatically treat a child node as inheriting the delegated administrators assigned to a parent node without requiring that they be assigned to the child node. Thus, for example, a delegated administrator with permissions to assign entitlements to users may assign to users of a child node entitlements assigned to the same child node as the user. The IGA system may, optionally, be configured to allow this behavior to be overridden or turn off for a certain child node if there is a reason for a child not to inherit the delegated administrator assigned to a parent node and instead be managed only by a delegated administrator(s) assigned to that node. Alternatively, a different and less preferred approach to achieving a similar behavior could be implemented by, for example, configuring the role or a delegated administrator entitlement to include within the delegated administrative authority the authority to assign to any user assigned to any child or subsidiary node an entitlement assigned to that user's node. It may also be implemented through allowing for different personas to be used, which are described below, or other ways. However, in each case, it is preferred that the delegated administrator will not be able to assign entitlements not available at that node for assignment to users of that node.

Optionally, the IGA system may be configured to permit end users of a first node—which will be referred to as a "delegated organization"—to be assigned entitlements that are available on a second node by a delegated administrator of the second node. Configuration of the assignment processes in the IGA system in this manner allows delegated administrator at the second node to assign an entitlement that has not been assigned to the first node to an end user of the first node. For example, this could be used to allow a delegated administrator at a business unit to give access to a network resource associated with the business unit to an outside auditor that is assigned to the relationship node corresponding to the external auditor.

The processes of the IGA automatically limit a delegated administrator's scope of authority to provision entitlements assigned to a node to users assigned to a node enable secure delegation to non-IT personnel of the business unit corresponding to the node. This reduces the burden on the information technology function of the parent entity. Additional benefits that flow from structuring the governance of the provisioning of access in this manner include automated delegation of an administrative authority consistent with network policies and assurances that the parent entity's security delegation model is applied throughout the computer network in a manner that can be verified for compliance. Furthermore, each relationship supports specialization without coding. This allows rapid assembly of relationship structures in coordination with one or many IdPs, without any multi-tenant limitations, branding specific to business units, and implementation of role-based dashboards for provisioning access and accessing shared network resources.

An example of a relationship model is a hierarchical model 500 shown in FIG. 5. The model is intended to be a representative example for purposes of describing the IGA system and is not comprehensive. In this example, the root node 502 represents a car manufacturer called "Demo Motors," which is the tenant for the IGA system. Child nodes are created for several functional units or departments within the Demo Motor's organization: operations 504, marketing 506, and company owned dealerships 506. Personnel with operational responsibilities at Demo Motors would be, for example, assigned to the operations node 504 as an end user. Personnel who are in the marketing department would be assigned to the marketing node 506. Executives or other personnel might be assigned to the Demo Motors node 502. Another child node represents collectively franchised or independent dealerships 509. The franchised dealers include a franchisee entity, "Reliable Autopark" 510, which is a third-party business not owned by Demo Motors but with whom it has a contractual or business relationship. The franchisee owns or operates two independent dealerships, "Houston Reliable" 512 and "Dallas Reliable" 514. The company owned dealerships 508 could represent a business unit within the Demo Motors or a separate legal entity owned or controlled by Demo Motors that operates or owns the dealerships. Or it could be simply a logical node representing all the company dealerships. The figure includes two examples of company owned dealerships: "Demo Austin Dealership" 516 and "Demo San Antonio Dealership" 518.

Listed under each of these nodes are entitlements that are available for assignment on the node: coarse-grained application access entitlements 520, fine-grained IGA system entitlements or "roles" 522, and fine-grained application entitlements 524. The exact entitlements depend on the node. Three of the nodes, franchisees 510, marketing 506, and company owned dealerships 508, do not have any entitlements associated with them. A node does not have to have any entitlements assigned to the node. In this example, the shared network applications include "SAP," "Inventory," "Salesforce," "IGA," and "Franchise Dashboard." A coarse-grained access entitlement for each of the first four of them is available for assignment to end users at root node 502. The SAP and IGA System access is available only to end users assigned to the root Demo Motors node 502. Coarse-grained access for "Franchise Dashboard" is available only on the franchisee nodes 512 and 514. This could be, for example, a special application intended for use only by franchisee dealerships that pulls information from various sources for display to employees at the franchisee owned dealerships. Coarse-grained access for Salesforce is available for end users assigned to the node of the franchisee, Reliable Autopark 510, and the franchisee-owned and company-owned dealerships 512, 514, 516, and 518. These end users are, for example, employees of the franchisee and each of the franchise and company-owner dealerships. However, only a "Salesforce User" fine-grained entitlement for the Salesforce application can be assigned to end users assigned to these nodes and to the Demo Motors nodes. This is a default level of access for the Salesforce application. Higher levels of access for the Salesforce application might be handled outside of the provisioning process governed by the IGA system. Coarse-grained application access to "Inventory" is available to be assigned to end users assigned to the Demo Users node 502 and the franchisee owned dealerships nodes 512 and 514. This application does not have fine-grained access entitlements associated with it.

As already mentioned, each user at each node is assigned a predefined "role" in the IGA system. Each role corresponds to an entitlement or set of permissions that the user has in the IGA application. In the illustrated example, the IGA roles available for delegated administrators at the root node 502 include "Manager," "Access Approver," and "Help Desk Admin." The other nodes with assignable IGA roles 522 that can be assigned include "Manager" and "Access Approver" or just "Manager."

In this example, a manager can perform user life-cycle management operations on users belonging to the node and child nodes. An access approver can approve access requests for the users of the node to which the approver is assigned and, optionally, at child nodes.

Examples of additional roles that might, optionally, exist in the IGA application and that could be made available for delegated administrators on a node are listed in the following Table 1, along with the capabilities or permissions that the roles have. Each role may have one or more of the listed capabilities; it need not have all the capabilities. Furthermore, different roles can be created based on these roles that could combine capabilities from multiple roles or have one or more of the same capabilities but of a different scope.

TABLE 1

| Role Name | Description | Capabilities | Remarks |
|---|---|---|---|
| Access Approver | Approve access for users in scope | Approve or deny user access requests | Can perform functions only for users in scope as determined by node assignment |
| Manager | Perform delegated administration tasks | Reset a user password Change a user profile Create a user Assign and remove access for a user Unlock user Activate/deactivate user | Can perform functions only for users in scope as determined by node assignment |
| Helpdesks Admin | Performs delegated help desk administration tasks | Reset User Password Change User Profile Unlock User Activate/Deactivate user | Can perform functions only for users in scope as determined by node assignment |
| End User | Perform self-service operations Request access to applications Access assigned applications and services through an interface | Reset password Change profile Change password Change recovery question Request access to applications and business services | Can only operate within the scope of services available in the node where the user was provisioned. |
| Access Reviewer | Can review access certification reports and certify/revoke/escalate access | Can perform access reviews | Can perform functions only for users in scope as determined by node assignment |
| Auditor | Access certification, delegates, and user roles reports | Access User Roles Reports-Access to Certification Reports Access Delegate Reports | Can perform functions only for users in scope as determined by node assignment |

A relationship model may also include an "Auditor" role. Users in the role may access certification reports on delegates and user roles. However, an auditor role allows the user to do this only for users within a scope as determined by the node assignment of the user given the auditor role.

Optionally, new nodes for a relationship model are created from predefined "node types," one for each type of business relationship that is permitted to exist in a relationship model. These node types include IGA roles and the coarse-grained application access and fine-grained entitlements that may be made available on an instantiated node for assigning to end users. These node types also limit the types of parent nodes that a node of that type can have and possibly impose other limitations on where nodes of the node type can be placed within a hierarchical structure.

A system administrator for the IGA system sets up the node types. An administrator will also configure core services and manage all aspects of the relationship model and underlying node configuration. An administrator may create and modify a business model, create and manage node types, create and manage nodes, assign services to nodes, and set scope and groups associated with nodes. The administrator has, in one embodiment, access to the administrative tenant only.

Optionally, for each relationship model, there is a user with a relationship manager role, which has permission to manage all aspects of a relationship model, including creating and managing nodes in the model, configuring node services, and assigning a user at each to the role of a manager. A relationship manager also has the permissions to perform the functions of IGA roles that are assigned on a per-node basis at any level in the node hierarchy. However, a relationship manager does not have the right to modify node types.

Figures 7, 8:
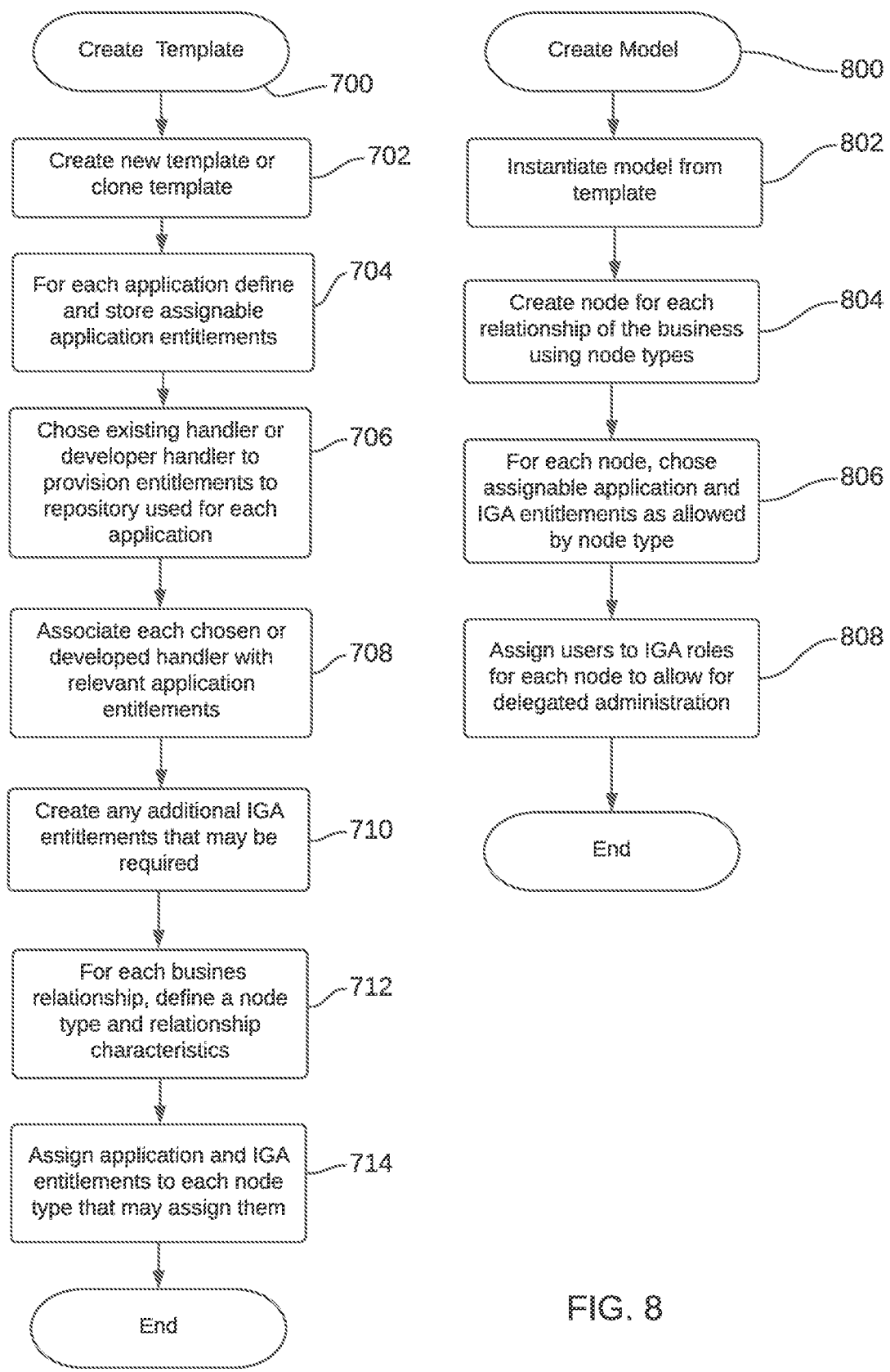
FIG. 7 illustrates the basic steps of a representative and non-limiting example of a computer process for creating a template that can be used to instantiate a relationship model for the IGA system.
FIG. 8 illustrates the basic steps of a representative and non-limiting example of a process for creating a relationship mode from a template.

Referring now to FIGS. 6, 7, and 8, a relationship model for the IGA system may, optionally, be created or "instantiated" by a relationship manager from a template set up by the system administrator and stored in a templates repository 340. The template is comprised of hierarchically arranged nodes, with each node corresponding to a node type. Nodes in a template may also be referred to as "node types" in the following description. Optionally, by hierarchically arranging the node types using, for example, a graphical representation displayed in the IGA system's user interface, the allowed relationship characteristics of a node type can be at least partially specified. Application entitlements that are allowed to be made available for assignment to end users of a node of that type and the IGA roles that are allowed for that node can be specified by the system administrator during the creation of the template according to a governance policy of an "administrative tenant" of the IGA system. Once a relationship model is created from a template, the relationship model will have an "operational tenant," with administrators that have IGA system entitlements limited to or "scoped by" the template. The operational tenant will typically be represented by the root node in the relationship model. An administrative tenant may have more than one relationship model and operational tenant.

FIG. 6 is an example of a template 600 for a hierarchical business model for a company with company-owned and franchised dealerships that sell the company's products, such as automobiles. This business model is an example of a predefined business model that can be used as a starting point for the IGA systems administrator to create a template that can be used to instantiate a relationship model, such as the one illustrated in FIG. 5. The IGA system 100 may, optionally, include a plurality of predefined business models for various industries, each corresponding to a relationship structure commonly found in one of the industries.

The business model template 600 has as its root node a node called "company" 602. The child nodes—which represent node types—of the company include "business unit" 604, which could be a department like engineering, marketing, or accounting, or some other type of business unit such as an assembly factory. The other child nodes are "company-owned dealerships" 608 and "franchised dealerships" 608. A "dealership" node 610, which would correspond to an actual dealership for the company's products, can be a child of the "company-owned dealerships" 606 node, the "franchised dealerships" 608 node, and a "franchisee" node type 612. This means that, in a relationship model that is instantiated based on this template or one derived from it, a node corresponding to an actual dealership is permitted to be a child node of a company-owned dealerships node, a franchised dealerships node, or a node corresponding a franchisee that, in turns, owns or operates the dealership. However, if a different set of entitlements needs to be given to a dealership node based on its parent node—for example, based on whether it is an independent or company owned dealership, different node types could be created for dealerships depending on the parent node type, each with different allowable entitlements and roles.

End users that are assigned to "company-owned dealerships" could be employees of the company that manages the relationship between the company and those dealerships. Similarly, end users on the "franchised dealerships" node could be employees of the company that manages the relationship between an independent dealership and the company and between a franchisee who might own multiple independent dealerships and the company. End users who are associated with the franchisee, such as owners, managers, employees, and contractors, could, for example, be assigned to a node created from the "franchisee" node type 612. End users who are associated with a dealership as an independent sales representative, staff, manager, or otherwise, regardless of the legal entity that employs them, could be, for example, be assigned to a node created from a "dealership" node-type. Other employees and contractors of the company could be assigned to one or more nodes created from the "business unit" node type 604 or to the company node type 602.

Associated with each of the node types are entitlements that are permitted to be assigned by nodes of the node type. These include permitted application access 614 entitlements, permitted IGA system roles 616, and permitted fine-grained entitlements 618 for applications. The application access and the fine-grained entitlements are entitlements for network resources. The IGA system role being an entitlement for the IGA system. The permitted entitlements are the only entitlements that may be assigned to a node in a relationship model with the node type. Not all the entitlements associated with the node type have to be assigned to the node. Assignment of a permitted entitlement to a node during the creation of the node makes that entitlement available for assignment to users associated with the node. The permitted entitlements and roles are therefore limitations on the scope of entitlements that users associated with the node can have in the relationship model. These limitations are set by a system administrator when defining a template and thus are used to enforce access policies when the relationship model is created or modified. The template, therefore, allows for a relationship model to be created by, for example, a relationship manager or other delegated administrator in the IGA system who does not have knowledge about the underlying IT infrastructure or the tenant's access policies, while ensuring that the access policies are adhered to. Access to network resources cannot be provisioned for end users associated with business relationships of a type that a system administrator has determined should not be allowed in accordance with the access policy of the tenant.

For example, when nodes are created from a "company owned dealerships" node type 606 and the "franchised dealerships" node type 608 in the business model template 600, coarse-grained application access for the "Salesforce" application ("APP_ACCESS_Salesforce") is allowed to be added to the node as an entitlement that could be made available to end users of a node with that node type. Furthermore, a "Salesforce User" entitlement is associated with each of these node types, which can be added to a node when created from either of these node types for assignment to end users of that node.

Each of the dealership node types includes the coarse-grained application access entitlement for an application— the "Workday" application—and a fine-grained entitlement, "Workday Admin," that authorizes an administrative level of access on the Workday application. The dealer node types also allow for a fine-grained entitlement, "Inventory Admin," which is an administrative level of access for an "Inventory" application that is used by the dealerships to track the inventory of products from the company being sold at the dealerships. Because a franchisee would likely not need access to the "inventory" application, there are no entitlements for the application associated with the "franchisee" node type 612. However, the franchisee node type allows for the assignment of access to the "Workday" application (APP_ACCESS_Workday) and assignment of an entitlement for administrative access to that application ("Workday Admin").

The "company" node type 602 has no entitlements or IGA roles. A system administrator for the tenant can set up any required entitlements for the node in a template created based on this business model template or after the root node is created.

Turning to the IGA system roles, the node types 606 and 608 do not have IGA roles for users assigned to these nodes. The node types 606 and 608 could, for example, permit users assigned to a "company" node created from "company" node type 602 that are assigned IGA delegated administrator roles can act as delegated administrators for these nodes. The users assigned to these roles can be controlled by the company. However, the dealership node type 610 includes the IGA roles of "Manger" and "Access Reviewer," which are described above. This allows for employees associated with the dealerships to manage the life cycle of identities and to approve provisioning of entitlements without the involvement of the company or, in the case of a dealership owned by the franchisee, the franchisee.

Furthermore, the IGA system may allow for creating a template without, in most cases, being constrained by who hosts or manages the applications, the nature of the applications, or the repository that provisions and authorizes user access to a particular network resource. A relationship model based on the template can thus be quickly implemented by someone with delegated administrative authority within the IGA system (which in the example of the IGA system described above is the relationship manager) without technical knowledge of the underlying network resources or identity and access management systems used to provision and control access while ensuring that the delegated authority is exercised according to an access governance model established by the tenant.

Furthermore, the IGA system processes also allow for abstraction and grouping of underlying access rights and permissions as a higher-level entitlement or "role," and the provisioning of access using the entitlement without any knowledge of the underlying network resources or how access is authorized. By allowing only the defined entitlement or "role" to be provisioned only to end users of a node type, controls over provisioning coarse-grained access and fine-grained entitlements are also automatically implemented according to the delegation and access governance policies of the administrative tenant.

FIG. 7 describes a process 700 for creating a template that can be used to instantiate a relationship model for the IGA system. At step 702, a new template is created. This can be done by cloning another template, such as a business model like the one shown in FIG. 6, or another template being used by the tenant of the IGA system. For each application—or more generally shared network resource—that will be shared with users of a computer system, one or more entitlements are defined and stored at step 704. Entitlements are defined, for example, as explained in connection with FIG. 4. Next, as represented by steps 706 and 708, a handler for provisioning the entitlements for a given application to the repository that is used to authorize access to the application to provide access according to the entitlement. This can be done using the methods and data relationships described above in connection with FIG. 4, in which an entitlement is associated with one or more resources that are stored in a resource directory and a handler is specified for the repository. If an existing handler cannot be used, one would need to be developed. At step 710, any IGA system entitlements (roles) that are not a default entitlement or role in the IGA system are defined.

Once all the entitlements are defined and handlers specified for provisioning those entitlements to the repositories that are used to authorize the relevant applications, a node type and relationship characteristics for each business relationship are created at step 712. (If additional entitlements need to be defined after node types are defined, these can be added.) The relationship characteristics specify, for example, what node type can be a parent node. It may optionally identify additional requirements that further limit whether a node can be created from the node type.

At step 714, for each node type, application entitlements are assigned to the node. Only the application entitlements that are permitted to be assigned by the node type can be assigned to the node. The IGA system does not require that all the entitlements allowed by the node type be assigned to the node, though it could be, optionally, configured to do so for a particular node type, relationship model, or all relationship models, or for the node type to require assignment to the node of one or more of the entitlements and roles. For example, the IGA system or a template for a relationship model may, optionally, have the capability of being configured or is configured to require that a manager be assigned to every node. Similarly, every node type does not have to have an application entitlement and IGA entitlement or any entitlements. Instantiating a node from a node type allows for the node to inherent the features of the node type. Enabling assignment of less than all the entitlements permitted by node type accommodates specialization or customization of the node based on the particular circumstances of the business relationship that the node represents. Furthermore, more generally, configuration settings for services that are inherited can be permitted to be overridden. Other examples of preconfigured services that could, optionally, be customized for a given node include settings for authenticating as user assigned to the node, workflows, directories with users that can be assigned to the node, what data can be displayed in an IGA interface based on the user's persona (see below).

FIG. 8 illustrates the basic steps of a representative and non-limiting example of a "create model" process 800 of the IGA system 100 for creating a relationship model from a previously created template and creating nodes based on the node types allowed in the template. The relationship model is a run-time model, being that it is used by the IGA system processes to manage life cycles of identities and to provision entitlements for users to entitlement repositories. The identities and entitlements are stored in, for IGA System 100, the source of record repository 102 (FIG. 2). At step 802, the relationship model is instantiated from the template. Instantiation creates a root node corresponding to the root node type of the model. An operational tenant may also be created, and an administrator for the relationship model called the "relationship manager" is also created. The relationship manager is an IGA system delegated administrator role. The name and domain for the operational tenant would be entered.

As indicated by step 804, the relationship manager creates a node for each relationship for the business. Each node must be one of the node types from the template and must conform to the relationship characteristics allowed for nodes of that node type. Each node must be one of the allowed node types and may only have a relationship with another node that is allowed for the node type. For each node, application entitlements and IGA roles are assigned at step 806 from the list of allowed application entitlements and IGA roles for the node's type.

As represented by step 808, users are then assigned to the IGA roles at each of the nodes. These IGA delegated administrators may, depending on their role, then add or approve adding of users to the node to which they are assigned (and, depending on the node type and definition of the entitlement corresponding to the IGA role, nodes that directly or indirectly depend from the node (each of which would be child node) They may also assign entitlements (initiate and/or approve assignment) to end users assigned to the node and, optionally, to end users of a "delegated organization."

The IGA system may, optionally, allow during creation of the relationship model an association of a first node in the relationship mode with a second node for purposes of, for example, assigning entitlements available for assignment at the second node to end users assigned to the first node. The business entity represented by the first node is referred to as a "delegated organization." This association extends, in effect, authority to assign entitlements available for assignment on the second node to end users of the first node. The end users of the first node become, in effect, associated with the second node for purposes of assigning entitlements that are available for assignment on the second node. The identities of the end users assigned to the first node continue to be managed by the delegated administrator that has permission to manage those identities. Furthermore, entitlements available for assignment at the first node continue to be available for assignment to the end users assigned to the first node by delegated administrators assigned to the first node.

Turning to FIG. 9, which is a representative and non-limiting example of an implementation of an "assigned entitlements" process 900 of the IGA system 100. The example process that is illustrated contemplates either an end user or an IGA delegated administrator ("delegate") making the request. However, the user interface—for example, user interface 336 (FIG. 3)—could optionally only present the option of requesting access to one or the other type of user.

As indicated by steps 902 and 904, if an IGA delegated administrator is requesting the assignment, the process first determines whether the IGA delegated administrator is permitted to assign or to request assignments for entitlements at the node to which the delegated administrator is assigned. If so, the process presents to the delegated administrator at step 906, for example, a graphical interface that allows the delegated administrator to request an entitlement assignment and/or to find and select an end user and to request an assignment of an entitlement to the end user. The group of end users or the end users that the process allows the delegated administrator to select are limited to those that are within the delegated administrator's "scope" of authority as defined by the node to which the delegated administrator is assigned. By default, the end users assigned to the same node as the delegated administrator is assigned are within the scope of the delegated administrator. Thus, the process will limit the end users that can be selected (or displayed for selection) to the end users assigned to the same node as the delegated administrator. However, optionally, the process may allow selection by, or included in lists or groups for selection by, the delegated administrator end users that are assigned to child nodes and/or end users of delegated organizations whose end users are delegated to the node. At step 908, the process looks up and displays entitlement from, for example, the source of record repository 102, that are available for assignment to the selected end user by on the node to which the user is assigned and the types of entitlements that are allowed to be assigned to end users of that node. For an end user of a delegated organization, this would include only the one or more entitlements of the node to which the organization has been delegated that are allowed by the node to be assigned to end users of a delegated organization.

An end user of a node may be permitted to request access to an entitlement by providing this capability in the IGA user interface for the end user, such as user interface 336. As indicated by step 910, the process will only allow selection of entitlements—which could be referred to as "roles" or "applications" or with other terms in the interface—that are available to the end user based on the end user's node assignment. This would be, for example, in most cases, the entitlements available to end users at the node to which the end user is assigned. However, the process may, optionally, allow for the selection of one or more entitlements available end users assigned to a different node, to which management of the end user has been delegated (such as by using the delegated organization feature described above.) The entitlements that can be assigned to the user could be presented for selection as a list, as "chicklet," or other graphical representation, or in response to a search.

At step 912, the process receives from the delegated administrator or user the assignment request and stores it. The process then determines at step 914 whether the assignment request must be approved by an "access approver" or other delegated administrator in the IGA system. This information might be associated with the entitlement in the source of record repository 102 or in the node in the relationship model through which the request is made. If it is stored in association with the relationship model, it could be associated with the node type or the node as a requirement added during creation. If approval is required, the process queues at step 916 the request for review by a delegated administrator. Delegated administrators with the permission to approve assignments of entitlements for the node may, for example, be presented with a page in the delegated administrator's interface that allows display of the queue or a dashboard that indicates that an entitlement assignment is waiting.

As represented by steps 918 and 920, if the request is not approved, the requestor is notified, such as through the user interface of the IGA system and/or in other ways. If the request does not require approval or has been approved, the process, as indicated by step 922, associates the entitlement with the user's identity in the IGA source of record repository 102, such as in the manner described in connection with FIG. 4. At step 924, a provisioning process is called to provision an entitlement to an entitlement repository. This may, for example, be in response to the approval or as part of a batch of entitlement changes that need to be provisioned. For an entitlement that has been assigned and not provisioned, the provisioning process will, as indicated by step 924, determine the correct handler, and as represented by step 926, invoke the handler to update the repository used to authorize access to an application based on the resource. The resource could be, for example, coarse-grained access to the application or fine-grained access to it. For example, with reference to the implementation represented by FIG. 4, this could be done using the entitlement's record in the entitlement's table 418 to look up each resource that is associated with entitlement, determining the resource directory where information about the resource is stored in a resource table 438, obtaining from the resource directory the handler 438 associated with the resource directory, setting up a communication link and session with the handler to the repository using the configuration information 436 stored in the resource directory and writing the to the repository the identity of the user and permission(s), which includes the application and level of access specified by the record in the resource table 438 for the resource.

Figures 10A, 10B, 10C:
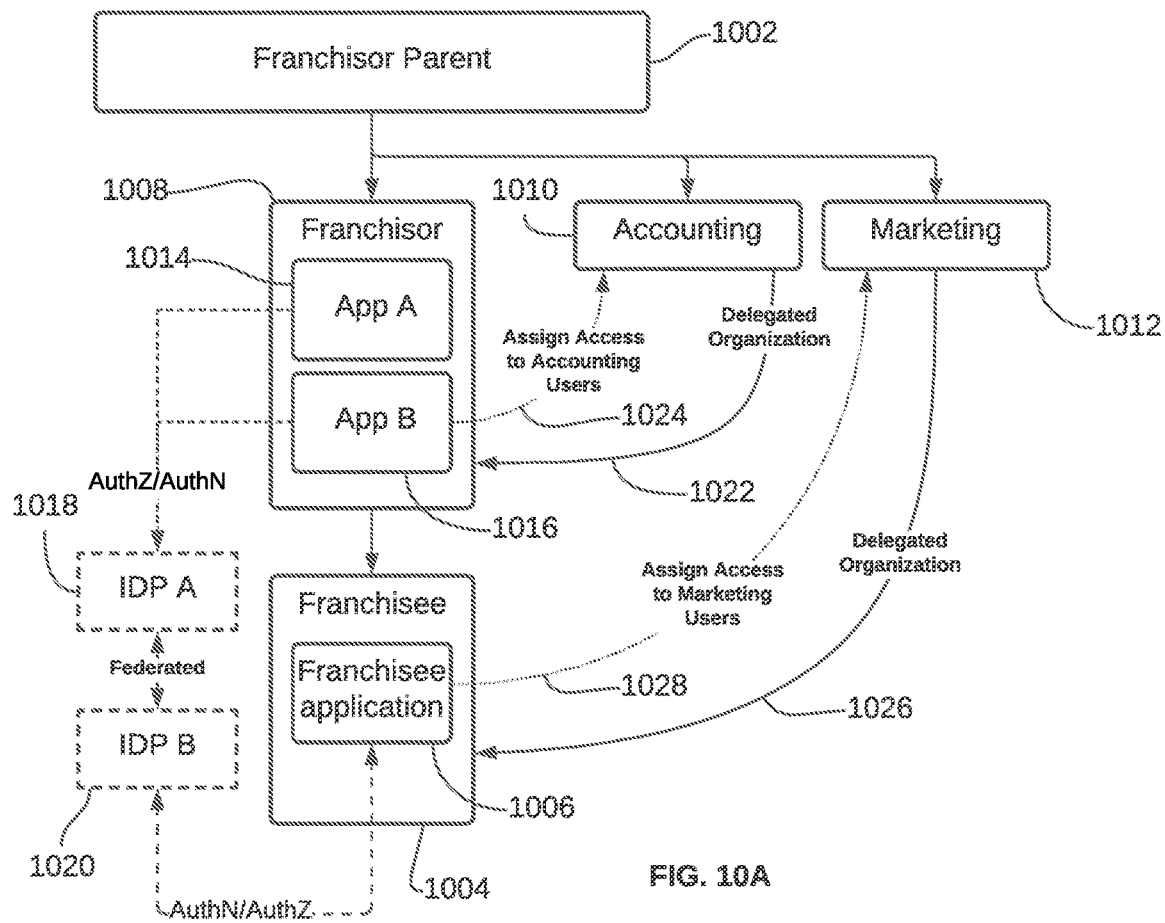
FIG. 10A schematically represents an example of business relationships in which an independent third party with a separate security domain shares a resource with users of a computer system that is part of a separate security domain with identity and access governed using an IGA system.
FIG. 10B represents a franchisor node in a relationship model for an IGA system corresponding to the business relationships shown in FIG. 10A.
FIG. 10C represents a franchisee node in the relationship model for an IGA system corresponding to the business relationships shown in FIG. 10A.

FIG. 10a schematically represents an example of a business relationship in which an independent third party with a separate security domain shares a resource with users of a computer system that is part of a separate security domain with identity and access governed using the IGA system 100. In this example, the administrative tenant of the IGA system is a franchisor parent entity 1002. An independent franchisee entity 1004 has a "franchisee application" 1006, to which it will give access to users managed by the IGA system, such as personnel of franchisor parent 1002 or a franchisor subsidiary 1008, with whom the franchisee has a contractual relationship. The franchisor parent, and possibly also the franchisor subsidiary 1008, have personnel that work in a department or business unit called "accounting" 1010 that provide accounting services to the franchisor entity 1008. Franchisor parent 1002 and possibly also franchisor subsidiary 1006 have personnel that work in a business unit called "franchise operations" 1012 that supports operations of franchisees. For identity and access management, the franchisor subsidiary uses IDP "A" 1018. Other business entities (not shown) affiliated with the franchisor parent could use other identity and access management systems. The IDP 1018 maintains an identity and entitlements repository for authorizing access for the franchisor's applications 1014 and 1016 and authenticating users seeking to access these applications. The franchisee 1004 uses IDP "B" 1020 as an identity and access management system. It maintains an identity and entitlements repository that authorizes access to the franchisee application 1006.

The franchisor parent 1002 is a tenant in an IGA system, such as IGA system 100. A relationship model for an IGA system is defined that includes nodes corresponding to franchisor parent 1002, the franchisee 1006, franchisor 1008, the accounting 1010 business entity, the franchisee operations 1012 business entity tenant at IDP 1018 with a hierarchy corresponding to what is shown in the figure.

Personnel in franchise operations 1012 need access to the franchisee application 1006. Personnel in accounting 1010 need access to one of two applications, 1014 and 1016, managed by the franchisor. Within the relationship model, the node representing accounting 1010 is delegated to the node representing franchisor 1008, as indicated by line 1022. This permits an IGA delegated administrator for the node representing franchisor 1008 to provision access to end users assigned to the node corresponding to the accounting 1010 business unit as represented by line 1024. The node representing marketing 1012 business unit in the relationship model is delegated to the node representing franchisee 1004, as represented by line 1026, which allows it to assign to end users assigned to the node representing marketing to be assigned an entitlement that provides access to the franchisee application 1006, as represented by line 1028.

Referring now also to FIGS. 10b and 10c, which represent, respectively, a franchisor node 1030 that represents franchisor subsidiary 1008 in the relationship model and a franchisee node 1032 that represents franchisee 1004 in the relationship model and include, as an example, a list of possible entitlements that can be assigned to end users assigned to the respective nodes and, in this example, to end users of an organization delegated to the respective nodes. The franchisor node and the franchisee each include two IGA delegated administrator roles or entitlements: manager and access approver. The franchisor node includes entitlements for accessing the franchisor's applications 1014 and 1016 (Access_App A and Access_App B), which provide coarse-grained access to the applications as a user and fine-grained entitlements for administrative level access to each of those applications (App A Admin and App B Admin). The franchisee node 1032 includes entitlements for coarse-grained access to the franchisor's application 1016 (Access_App B), which provides coarse-grained access as a user to the franchisor's application 1016, which provides fine-grained access as a user to the Franchisee's application 1016. The manager of the franchisee node 1032 would, for example, add as end users to node 1032 personnel of the franchisee to allow them to be assigned the Access_App B entitlement to have access to the franchisor's application 1016.

Because the node representing accounting 1010 is delegated the node 1030, the IGA delegated administrator, which is "Manager" in this example, can authorize provisioning of access to the franchisor's application 1016 to end users assigned to the node representing accounting 1010, which would be personnel who work in the accounting department 1010. Similarly, a "Manager" for franchisee node 1032 can authorize an assignment of the entitlement "Franchisee App User" to end users assigned to the node representing marketing 1012, which would include personnel of the franchisor parent and franchisor subsidiary.

The nodes representing accounting 1010 and marketing 1012 do not have to be limited to personnel that work for the franchisor parent or subsidiary. They could, for example, include personnel of the franchisee.

Access to the franchisee application is managed by the franchisee using IDP 1020. To enable the IGA system to provision access to the franchisee application 1004 to end users assigned to the node corresponding to the marketing 1012 business entity, the tenant for the franchisor 1008 at IDP 1018 and the tenant for franchisee 1006 at the IDP 1020 are federated.

To avoid a user needing multiple identities, such as one to use for end user access and other to use for administrative access, an identity governance tool or system can be configured to implement a process in which a single identity can be assigned different sets of entitlements to allow for different levels of access or privilege. The process creates, at least, one persona for each identity and permits an identity to have multiple "personas" assigned to it. The process then associates each entitlement—an application or other network resource and, optionally, a level of access (permissions)—to the user's identity and to the persona associated with the identity. After the user authenticates using, for example, a single-sign on service, a persona is selected. The user may select the persona through a sign-on or login screen, or through a user interface to the identity governance system. Alternatively, or in addition, the persona could be automatically selected based on one or more preconfigured conditions other than the identity and login credentials, such as the location of the user's device is located, an application that the user is trying to log into, or the time of day. Based on the selected persona, one or more claims are generated and presented to one or more network resources associated with the selected persona to authorize the application to grant access with the privileges asserted in the claim. The processes may, optionally, be configured to allow a user to switch personas without requiring the user to log in again or to present again the login credentials if the prior sign on session is still valid. Optionally, the process may also be configured to require authentication when switching personas in certain circumstances.

Using the embodiment of the IGA system discussed above as a representative example of an implementation that has a relationship model, a persona for a user is defined by a node in a relationship model and a level of access at the node. A user may have one or more personas associated with a node. For example, one persona may have assigned to it entitlement that is provisioned to authorize access to an application as an end user and another entitlement that is provisioned to authorize administrative access to the application. However, a user may have personas associated with different nodes, with the entitlements (coarse grain access and fine-grain permissions) that are able to be assigned to user's persona limited to those that can be assigned to users associated with that node. To implement these processes, the IGA system could, for example, store in the source of record 400 (FIG. 4) at least one persona for each user (e.g., an end user persona by default) and associate each entitlement 428 assigned associating to a persona of the user. A user authenticates using a single identity and a single set of credentials. If the identity has associated with it multiple personas, the IGA system presents the user a prompt or option to select a persona when the user authenticates. This can be done, for example, when the user logins through the user interface of the IGA system—for example, the web portal discussed above—or in other ways, such as, for example, when the user attempts to log into an application through an SSO process. Based on the persona selection and the entitlement(s) associated with the selected persona, the appropriate authorization in the form of, for example, a claim is generated and sent to the application or other network resource. The claim authorizes the application or network resource to give access to the user with the permissions specified in the claim; the permissions are those defined by the entitlement that is assigned to the user's persona. The IGA may generate this claim directly or cause it to be generated and sent in response to the selection. If this is not possible, or as an alternative, the application could be set up to query the IGA system through its API for the permissions.

Basic elements of this process are not dependent on certain of the features and functions of the IGA system that are described above and thus could be adapted for use in different types of identity governance tools without implementing those features.

In another process, an identity governance tool or system can be configured to allow an administrator, such as a delegated administrator in the examples of IGA system processes described above, who is logged into the system with their own identity under one identity to impersonate another to troubleshoot access related issues. An administrator, when logged into the identity governance system, is presented in a user interface an option of selecting a user to impersonate from a list of users that the administrator is permitted to impersonate. In response to selecting the impersonation option, the tool updates the user interface to reflect the interface that the impersonated user would see. Optionally, the interface also indicates that the screen is for an impersonated user to avoid any confusion. From this screen, the administrator may select applications and other network resources for which the user has been given entitlements to access. Depending on the level of permissions that the administrator has, the processes are configured in this embodiment to permit the administrator only to view what the impersonated user sees when interacting with the identity governance system. However, optionally, the impersonation processes may be configured to allow for an administrative user to be provisioned an entitlement that permits the administrator to have identity governance system authorize a network resource assigned to the impersonated user to give access to the administrator to a network resource assigned to the user as the user.

In the example of a delegated administrator in an identity governance system with a relationship model like the ones described above, the "role" or entitlements for the identity governance system that are assigned to the delegated administrator would give the user permission to impersonate certain users (e.g. end users but possibly also delegated administrators) within their scope. Users within their scope could be, for example, who are assigned to the node that the delegated administrator is assigned to and, depending on the embodiment, and users assigned to a child node or, possibly, from a delegated node or child.

The foregoing description is of exemplary and preferred embodiments. The invention, as defined by the appended claims, is not limited to the described embodiments. Alterations, substitutions, and modifications to the disclosed embodiments may be made without departing from the invention as claimed.

What is claimed is:

1. In a system that implements one or more identity governance functions for a computer network, a method implemented by one or more programs executing on one or more computers to control provisioning of user access to one or more resources of the computer network, the method comprising:

storing in one or more repositories, identities for users of the computer network, each identity comprising a unique identifier and one or more user attributes;

predefined entitlements for authorizing access to the computer resources, each of the predefined entitlements comprising information identifying one or more of the shared resources and, for at least one of the one or more of the resources, a level of access;

an assignment of each of the identities to one or more of nodes of a predefined relationship model, the predefined relationship model comprising multiple nodes arranged in hierarchical relationships, with relationships between the nodes corresponding to business relationships between business entities; and assignments of the predefined entitlements to one or more of the nodes of the predefined relationship model; and before storing in the one or more repositories an assignment of one of the predefined entitlements to one of the identities, determining if the assignment is permitted and, if permitted, storing the assignment in the one or more repositories, and otherwise not storing the assignment; and in response to storing the assignment of one of the predefined entitlements to an identity, provisioning authorization for the identity to access each of the one or more of the shared resources comprising the entitlement with the level of access, if any, specified in the entitlement for the shared resource;

wherein determining if the assignment is permitted comprises determining from the one or more repositories whether the identity and the predefined entitlement are assigned to the same node of the relationship model and, if so, determining that the assignment is permitted.

2. The method of claim 1, wherein determining if the assignment is permitted further comprises determining whether the identity is assigned to a node that has been delegated to the node to which the predefined entitlement is assigned and, if it is, determining that the assignment is permitted.

3. The method of claim 1, wherein determining if the assignment is permitted further comprises:

determining whether the assignment is approved and, if not approved, determining that it is not permitted; and determining that the assignment is permitted if it was approved by a delegated administrator with permission to approve the assignment, wherein a delegated administrator has permission to approve an assignment if the delegated administrator has an identity assigned to the same node as the predefined entitlement.

4. The method of claim 3, wherein a delegated administrator has permission to approve an assignment if the delegated administrator has an identity assigned to a node in the relationship model that is a parent to the node to which the predefined entitlement is assigned.

5. The method of claim 1, wherein determining if the assignment is permitted further comprises:

determining whether the assignment is approved by a user and, if not approved, determining that it is not permitted; and determining that the assignment is approved if the assignment is requested by a user with the identity to which the predefined entitlement is to be assigned and the entitlement does not require approval of another user for assignment.

6. The method of claim 1, wherein determining if the assignment is permitted further comprises determining if the assignment was requested by a user with an identity permitted to make the request and, if the identity is not permitted to make the request determining that the assignment is not permitted.

7. The method of claim 6, wherein the identity is permitted to make the request if the identity making the request is the same as the identity to which the predefined entitlement is to be assigned.

8. The method of claim 1, wherein
each node in the relationship model is one of a plurality of predefined node types;
any of the predefined entitlements that may be assigned to a node of a node type are specified with the node type.

9. The method of claim 8, wherein each node type has further associated any predefined delegated administrator entitlements that may be assigned to a node of that type.

10. The method of claim 1 wherein the relationship model is instantiated based on a template that defines node types permitted in the relationship model, relationships between the node types, and, for each node type any of the predefined entitlements that are permitted to be assigned to a node of that type in the relationship model.

11. The method of claim 10, wherein the template is based on one of a plurality of predefined business model templates.

12. The method of claim 1, wherein provisioning authorization comprises provisioning access for the identity to the one or more resources comprising the entitlement to one or more entitlement repositories that authorize the one or more resources to give access.

13. The method of claim 12, wherein the one or more entitlement repositories include multiple entitlement repositories, and wherein the method further comprises storing an association for each of the resources in each of the predefined entitlements with one of the multiple of entitlement repositories, and wherein provisioning access for the identity to each of the one or more resources comprises determining from the stored association which of the multiple entitlement repositories authorizes access for the resource.

14. The method of claim 13, wherein the multiple of entitlement repositories comprises at least one identity provider and at least one on-premises entitlements repository.

15. The method of claim 13, wherein the multiple of entitlement repositories comprises at least two identity providers.

16. The method of claim 13, further comprising storing for each of the resources an association with a handler process capable of communicating with the entitlement repository that authorizes access to the resource; wherein provisioning access for the identity to each of the one or more resources further comprises determining the associated the handler process to update the entitlements repository with the access for the identity.

17. A method implemented by one or more programs executing on one or more computers for provisioning of user access to one or more resources of the computer network, the method comprising:
storing identities for users of the computer network, each identity comprising a unique identifier and one or more user attributes;
storing predefined entitlements for authorizing access to the computer resources, each of the predefined entitlements comprising information identifying one or more of the shared resources and, for at least one of the one or more of the resources, indicating a level of access;
storing assignments of the identities to nodes of a predefined relationship model, the predefined relationship model comprising multiple nodes arranged in hierarchical relationships, with relationships between the nodes corresponding to business relationships between business entities; and
storing assignments of the predefined entitlements to nodes of the predefined relationship model; and
in response to receiving a request to assign one of the predefined entitlements to one of the identities, determining whether the assignment is permitted, wherein determining whether the assignment is permitted comprises determining whether the identity is assigned to the same node or a node that has been delegated to the node to which the predefined entitlement is assigned and, if not, not permitting the assignment;
storing permitted assignments predefined entitlement to identities; and
for each of the stored permitted assignments of predefined entitlements to identities, provisioning authorization for the identity to access each of the one or more shared resources identified in the predefined entitlements.

18. The method of claim 17, provisioning access for the identity to access each of the one or more resources comprises provisioning the entitlement to one or more entitlement repositories that authorize the one or more resources to give access.

19. The method of claim 17,
wherein determining if the assignment is permitted further comprises determining whether approval of an assignment has been received from an administrator with permission to approve the assignment and, if not approved, determining that the assignment is not permitted; and
wherein an administrator has permission to approve an assignment if the administrator has an identity assigned to the same node as the predefined entitlement or a node that is higher in the hierarchical relationships of nodes of the relationship model.

* * * * *